(12) United States Patent
Gaiser

(10) Patent No.: US 8,543,434 B2
(45) Date of Patent: *Sep. 24, 2013

(54) SYSTEMS AND METHODS FOR MOBILE AND/OR MODULAR MANUFACTURING

(75) Inventor: Karin S. Gaiser, Dayton, OH (US)

(73) Assignee: Ecovision Technologies, LLC, Dayton, OH (US)

( * ) Notice: Subject to any disclaimer, the term of this patent is extended or adjusted under 35 U.S.C. 154(b) by 1336 days.

This patent is subject to a terminal disclaimer.

(21) Appl. No.: 12/127,402

(22) Filed: May 27, 2008

(65) Prior Publication Data

US 2012/0274000 A1    Nov. 1, 2012

Related U.S. Application Data

(60) Provisional application No. 60/940,309, filed on May 25, 2007.

(51) Int. Cl.
- *G06Q 10/00* (2012.01)
- *A23P 1/00* (2006.01)
- *B29B 11/06* (2006.01)
- *B29C 35/00* (2006.01)
- *B29C 45/00* (2006.01)

(52) U.S. Cl.
USPC .......................... 705/7.11; 425/572; 425/556

(58) Field of Classification Search
USPC .................. 425/556, 564, 572; 705/7.11
See application file for complete search history.

(56) References Cited

U.S. PATENT DOCUMENTS

| 1,408,996 | A |   | 3/1922  | Beardsley et al. |
| 4,061,705 | A |   | 12/1977 | Marcus |
| 4,202,522 | A |   | 5/1980  | Hanas et al. |
| 4,219,323 | A |   | 8/1980  | Bright et al. |
| 4,268,240 | A |   | 5/1981  | Rees et al. |
| 4,379,525 | A | * | 4/1983  | Nowicki et al. ................. 241/20 |
| 4,382,760 | A |   | 5/1983  | Wiatt et al. |
| 4,395,222 | A |   | 7/1983  | Gaiser et al. |
| 4,412,806 | A |   | 11/1983 | Gaiser et al. |

(Continued)

FOREIGN PATENT DOCUMENTS

WO    PCT/NL05/000732    4/2006

OTHER PUBLICATIONS

Ashok Kumar. (2004). Mass Customization: Metrics and Modularity. International Journal of Flexible Manufacturing Systems, 16(4), 287-311. Retrieved Jun. 5, 2011, from ABI/INFORM Global. (Document ID: 963416451).*

(Continued)

*Primary Examiner* — Jonathan G Sterrett
*Assistant Examiner* — Folashade Anderson
(74) *Attorney, Agent, or Firm* — Dinsmore & Shohl LLP

(57) ABSTRACT

Systems and methods for manufacturing that are scaleable and de-scaleable based upon the production requirements of the customer's manufacturing facility. Systems and methods for mobile and/or modular manufacturing positioned at or near a customer's production facility that are scaleable and de-scaleable based upon the production requirements of the customer's manufacturing facility. The systems and methods of manufacturing may include identifying a customer's production requirements at the customer's production facility, designing a manufacturing cell based upon the identified production requirements, delivering components for the manufacturing cell to a location at or near the customer's production facility, assembling the components to form the manufacturing cell at the location, and training operational personnel to operate the manufacturing cell. The systems and methods may comprise using a modular preform mold system.

18 Claims, 35 Drawing Sheets

(56) References Cited

U.S. PATENT DOCUMENTS

| | | | |
|---|---|---|---|
| 4,432,720 A | 2/1984 | Wiatt et al. | |
| 4,435,146 A | 3/1984 | Wiatt et al. | |
| 4,487,568 A | 12/1984 | Wiatt et al. | |
| 4,497,624 A | 2/1985 | Brun et al. | |
| 4,620,958 A * | 11/1986 | Wiechard | 264/297.2 |
| 4,786,455 A | 11/1988 | Krishnakumar et al. | |
| 4,793,785 A | 12/1988 | Osada | |
| 4,831,719 A | 5/1989 | Tsai | |
| 4,836,767 A | 6/1989 | Schad et al. | |
| 5,028,226 A * | 7/1991 | De'ath et al. | 425/130 |
| 5,114,330 A | 5/1992 | Nielsen | |
| 5,147,663 A | 9/1992 | Trakas | |
| 5,240,402 A | 8/1993 | Ingram | |
| 5,316,463 A | 5/1994 | Neu | |
| 5,533,882 A | 7/1996 | Gessner et al. | |
| 5,536,164 A | 7/1996 | Brun, Jr. et al. | |
| 5,562,935 A | 10/1996 | Martin | |
| 5,595,771 A | 1/1997 | Foltuz et al. | |
| 5,645,865 A | 7/1997 | Schad et al. | |
| 5,653,934 A | 8/1997 | Brun, Jr. et al. | |
| 5,731,014 A * | 3/1998 | Travaglini | 425/190 |
| 5,738,149 A | 4/1998 | Brun, Jr. et al. | |
| 5,824,249 A | 10/1998 | Leitch et al. | |
| 5,840,350 A | 11/1998 | Salemi | |
| 5,863,485 A | 1/1999 | Groleau | |
| 6,082,991 A | 7/2000 | Rozenberg | |
| 6,123,891 A | 9/2000 | De Tonnac | |
| 6,196,824 B1 * | 3/2001 | Foltuz et al. | 425/190 |
| 6,206,674 B1 | 3/2001 | Foltuz et al. | |
| 6,220,850 B1 | 4/2001 | Catoen et al. | |
| 6,355,197 B1 | 3/2002 | Lausenhammer et al. | |
| 6,375,890 B1 | 4/2002 | Salemi | |
| D460,467 S | 7/2002 | Gross | |
| D460,766 S | 7/2002 | Gross | |
| D460,976 S | 7/2002 | Gross | |
| D460,977 S | 7/2002 | Gross | |
| 6,537,053 B1 | 3/2003 | Watkins | |
| 6,540,499 B2 | 4/2003 | Schneider | |
| 6,713,013 B2 | 3/2004 | Wunderlich | |
| 6,726,465 B2 | 4/2004 | Groleau | |
| 6,749,779 B2 | 6/2004 | Soane et al. | |
| 6,845,279 B1 * | 1/2005 | Gilmore et al. | 700/115 |
| 6,859,683 B2 * | 2/2005 | Parker et al. | 700/259 |
| 6,887,418 B2 | 5/2005 | Olaru et al. | |
| 6,896,505 B2 | 5/2005 | Towery et al. | |
| 6,936,198 B2 | 8/2005 | Duringer | |
| 6,994,810 B2 | 2/2006 | Hahn et al. | |
| 7,037,103 B2 | 5/2006 | Niewels | |
| 7,204,685 B1 | 4/2007 | Crain et al. | |
| 7,300,271 B2 | 11/2007 | Parmenter et al. | |
| 7,338,626 B1 | 3/2008 | Groth | |
| 7,497,677 B1 | 3/2009 | Crian et al. | |
| 7,500,843 B2 | 3/2009 | Crain et al. | |
| 7,731,489 B2 * | 6/2010 | Fairy | 425/130 |
| 7,854,876 B2 * | 12/2010 | Gaiser | 264/297.2 |
| 2002/0102320 A1 | 8/2002 | Hahn et al. | |
| 2002/0105113 A1 | 8/2002 | Wright et al. | |
| 2003/0173718 A1 | 9/2003 | Wunderlich | |
| 2004/0047935 A1 * | 3/2004 | Moss et al. | 425/145 |
| 2004/0059588 A1 * | 3/2004 | Burritt et al. | 705/1 |
| 2004/0076703 A1 | 4/2004 | Saulle | |
| 2006/0051445 A1 | 3/2006 | Rundberg et al. | |
| 2006/0159793 A1 | 7/2006 | Hahn et al. | |
| 2006/0269649 A1 * | 11/2006 | Ciccone | 425/556 |
| 2006/0273489 A1 | 12/2006 | Shakal | |
| 2006/0290034 A1 | 12/2006 | Sideris | |
| 2008/0003321 A1 | 1/2008 | Kerr et al. | |
| 2008/0296806 A1 | 12/2008 | Brand et al. | |
| 2009/0081324 A1 | 3/2009 | Kuo | |

OTHER PUBLICATIONS

R Manzini, M Gamberi, A Regattieri, & A Persona. (2004). Framework for designing a flexible cellular assembly system. International Journal of Production Research, 42(17), 3505-3528. Retrieved Jun. 5, 2011, from ABI/INFORM Global. (Document ID: 780839641).*

Duggan, Kevin (1998). IIE Solutions: Facilities Design for Lean Manufacturing, p. 30-34.*

Edward Mason. (Feb. 2005). High-voltage moulding. Plastics in Canada, 12(1), 12. Retrieved Feb. 25, 2012, from ABI/INFORM Trade & Industry. (Document ID: 808200681).*

Nam P. Suh, David S. Cochran, Paulo C. Lima(1998) Manufacturing System Design. CIRP Annals—Manufacturing Technology vol. 47, Issue 2, 1998, pp. 627-639 Retrieved Nov. 6, 2012 from http://dx.doi.org/10.1016/S0007-8506(07)63245-4, Available online Jul. 10, 2007.*

U.S. Office Action mailed Feb. 29, 2012 in reference to co-pending U.S. Appl. No. 12/948,093, filed Nov. 17, 2010.

* cited by examiner

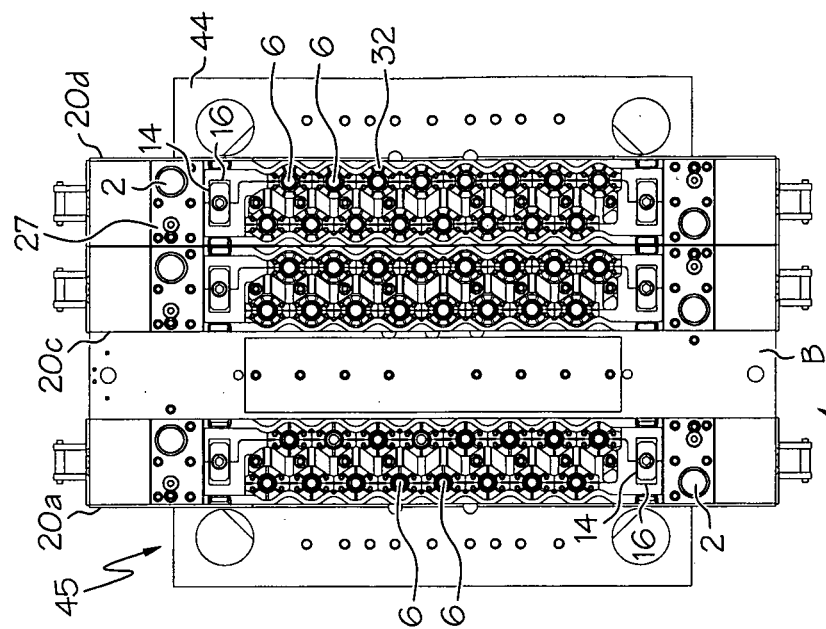
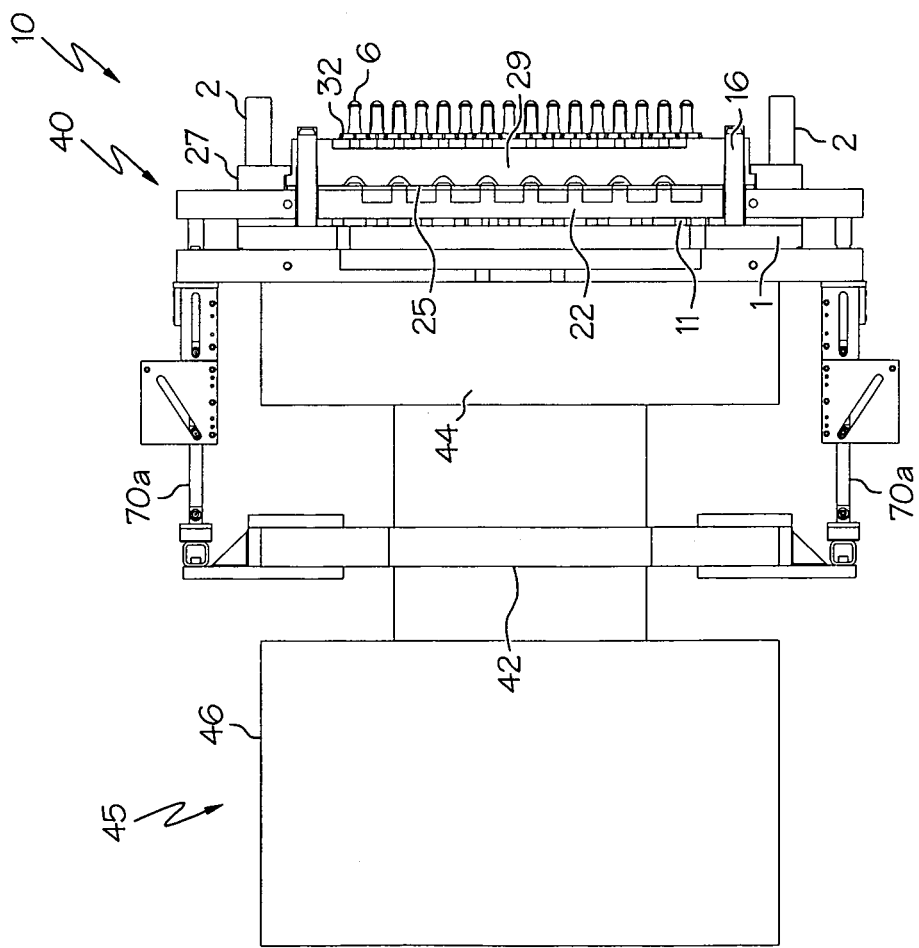
FIG. 3c
FIG. 3b

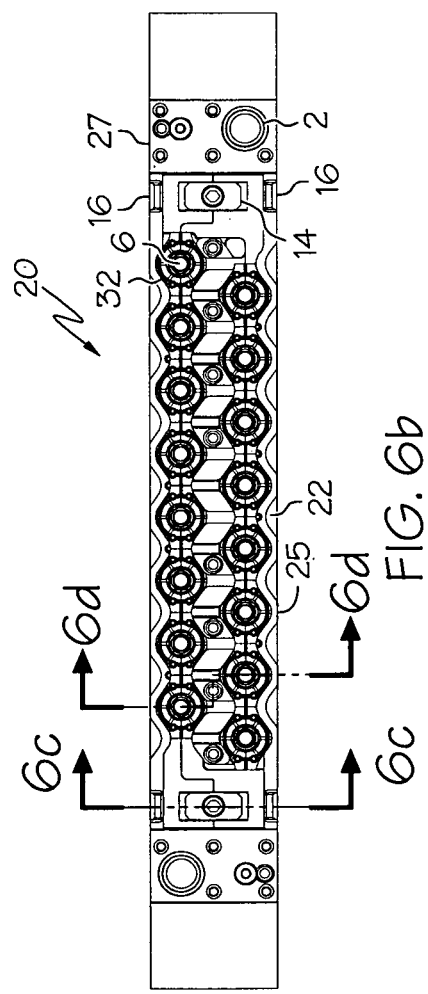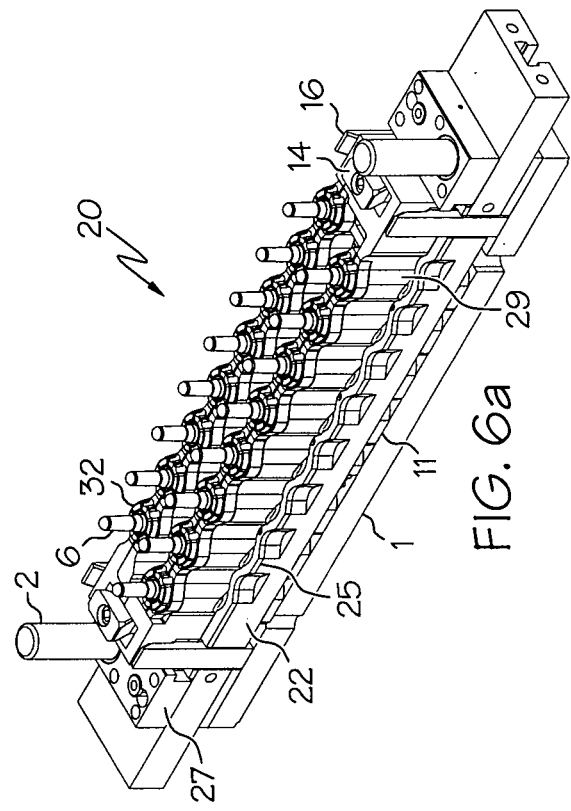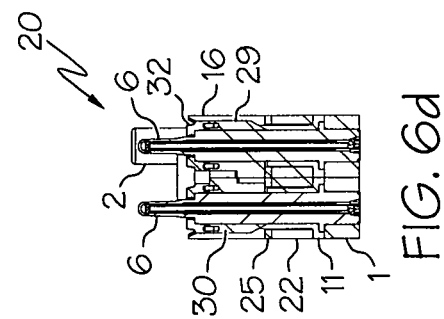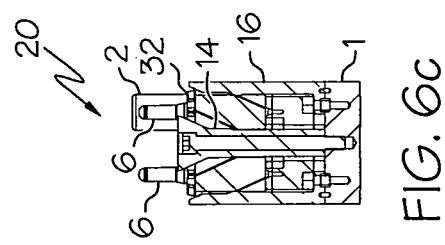

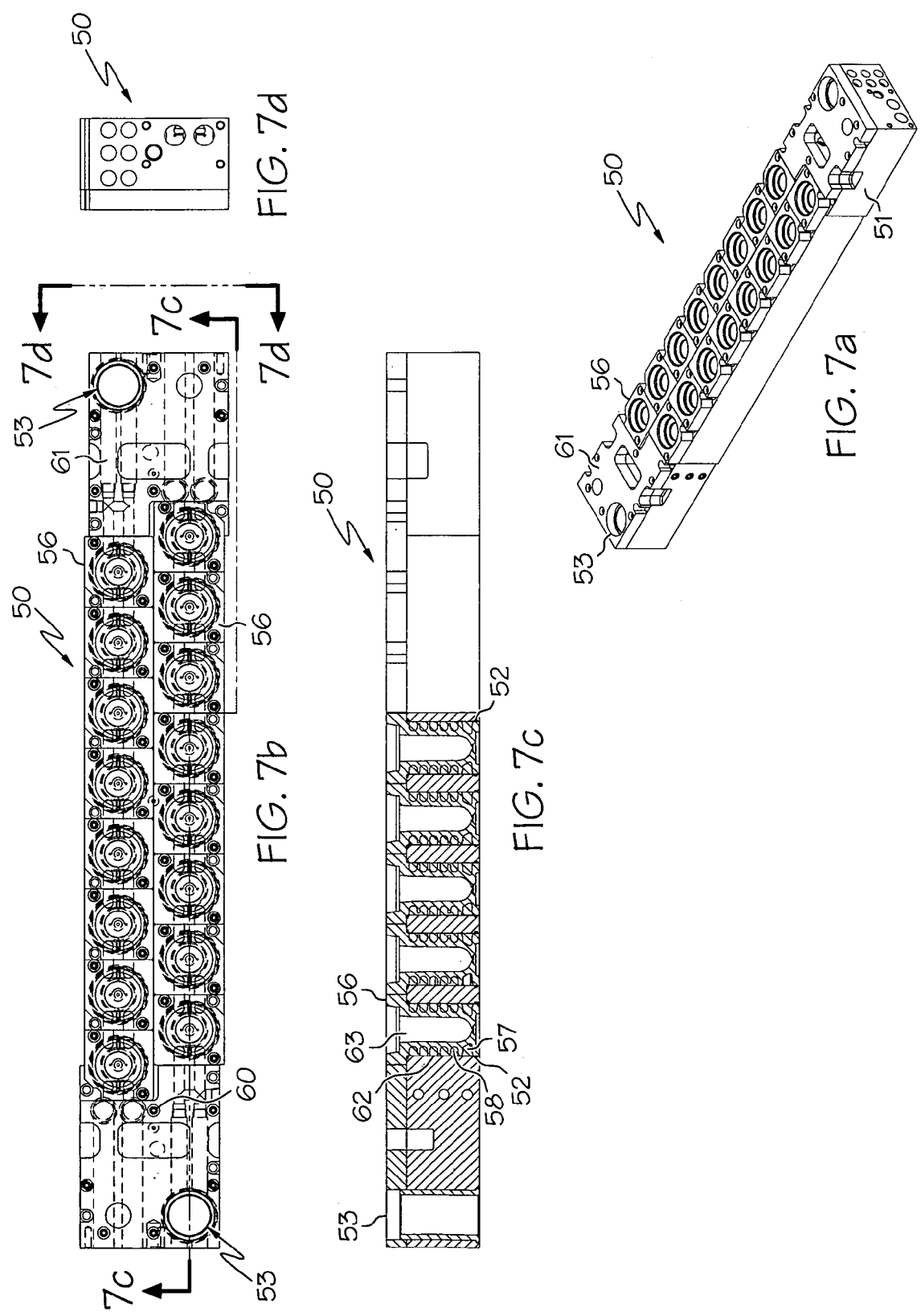

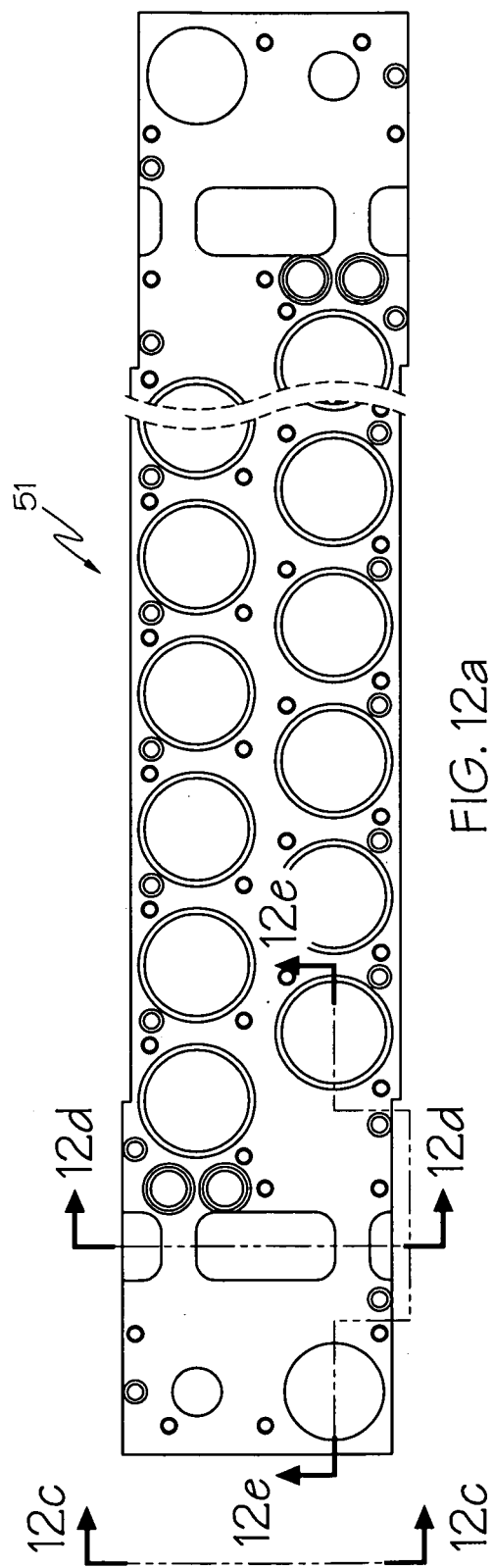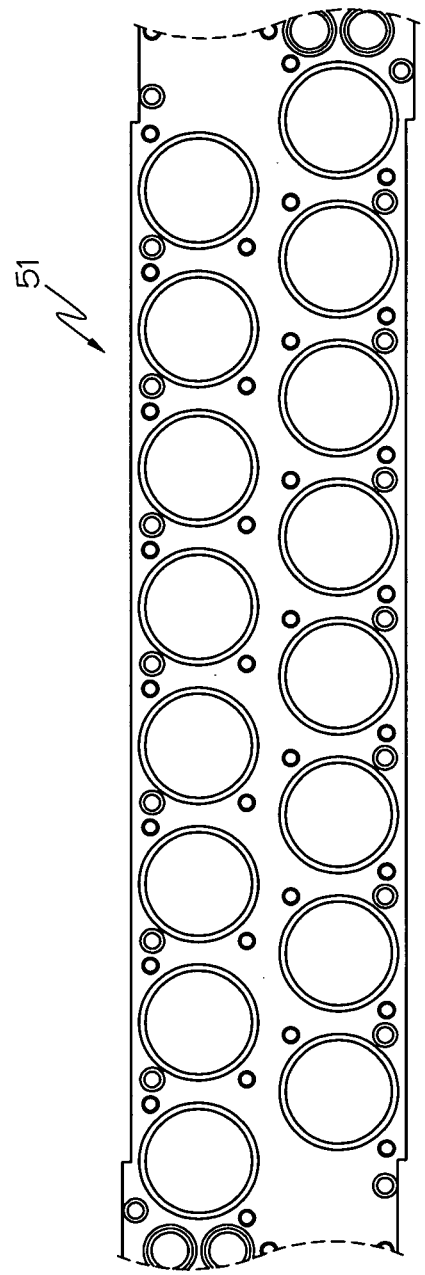
FIG. 12a
FIG. 12b

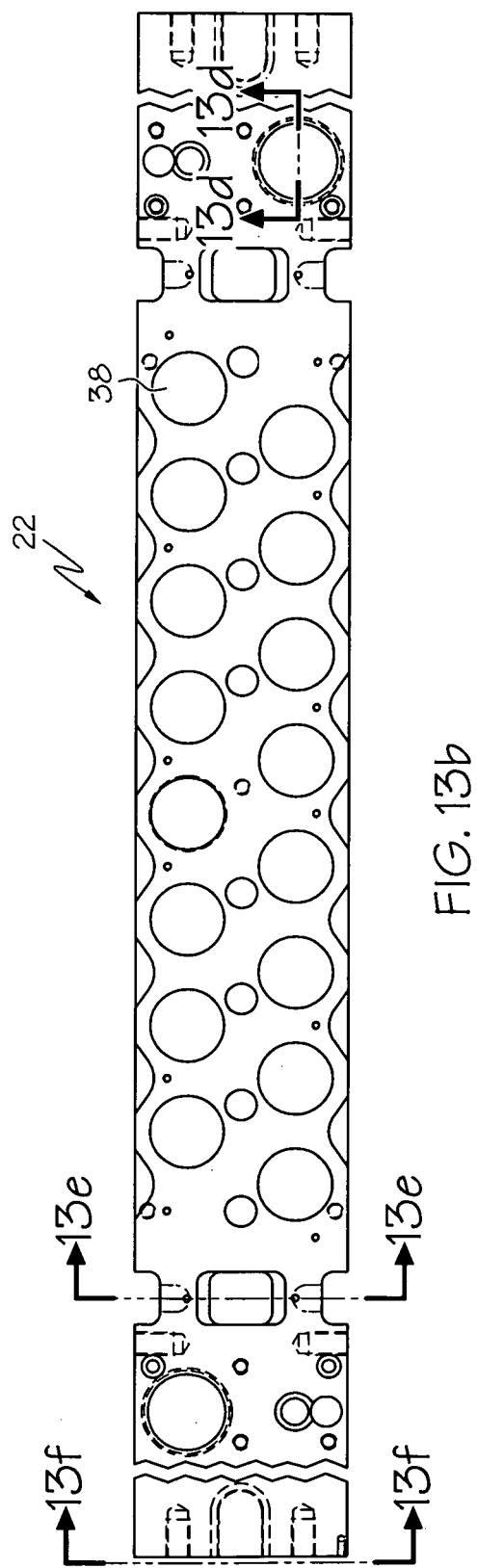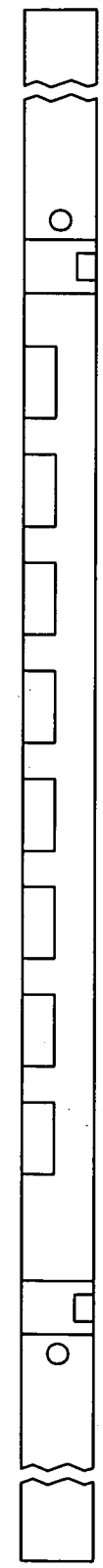
FIG. 13b
FIG. 13c

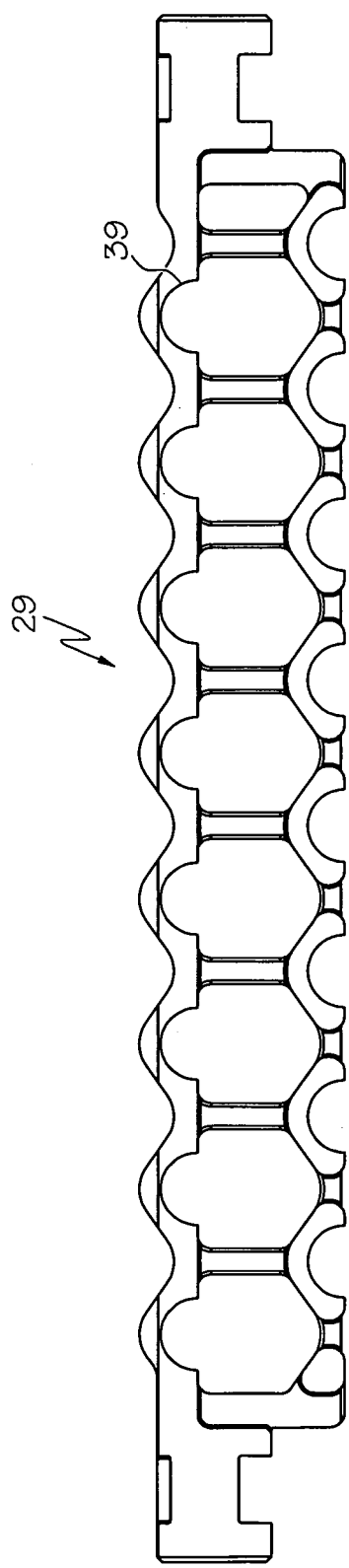
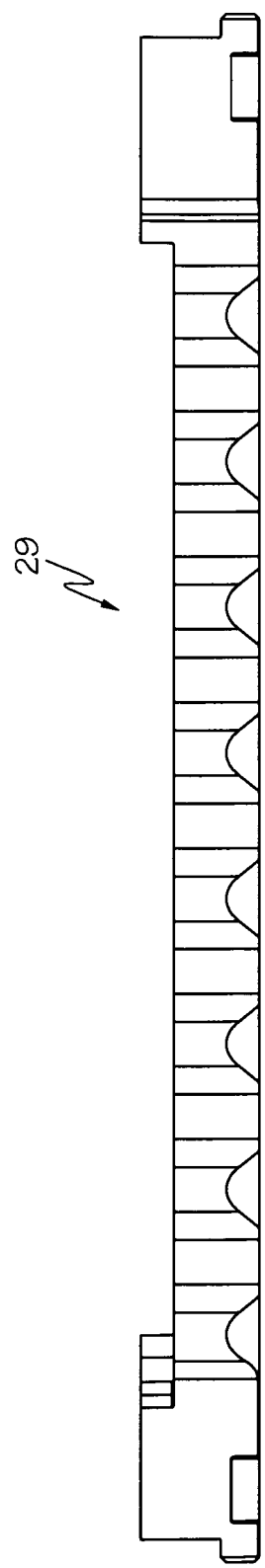
FIG. 15a
FIG. 15b

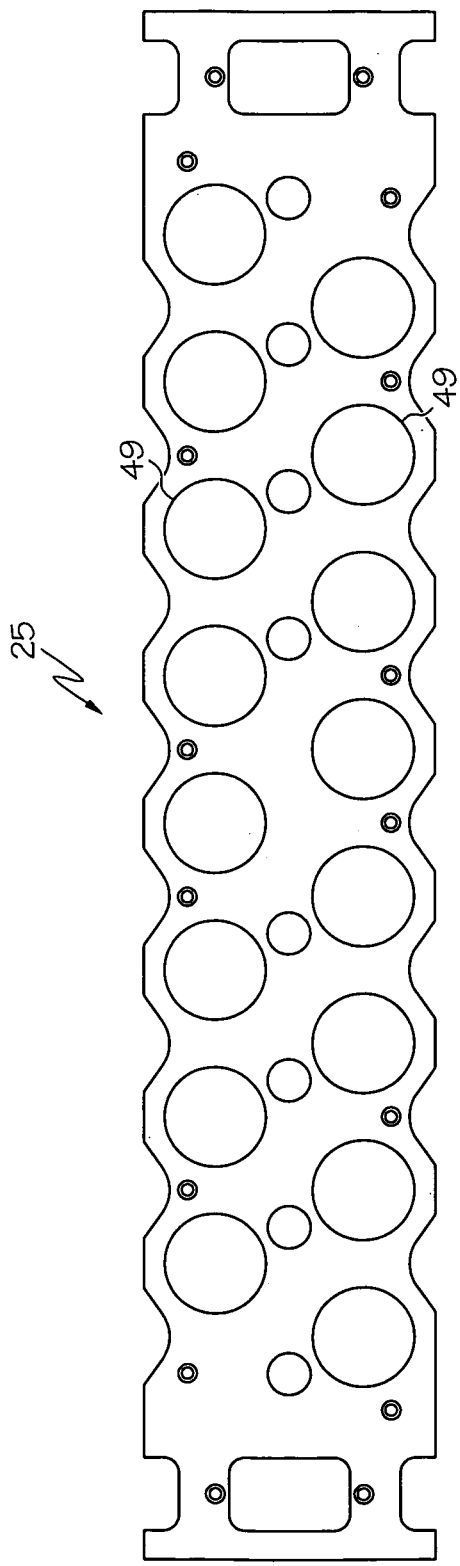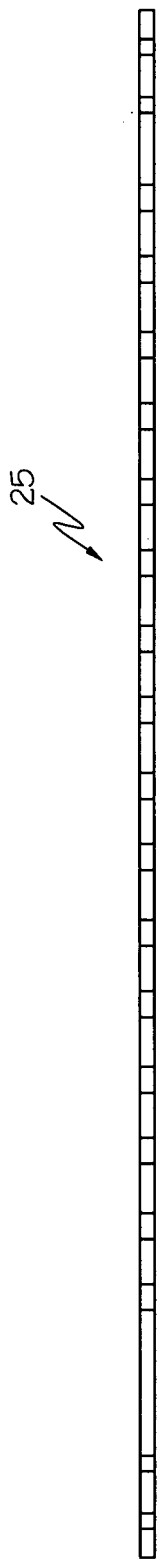
FIG. 20a
FIG. 20b

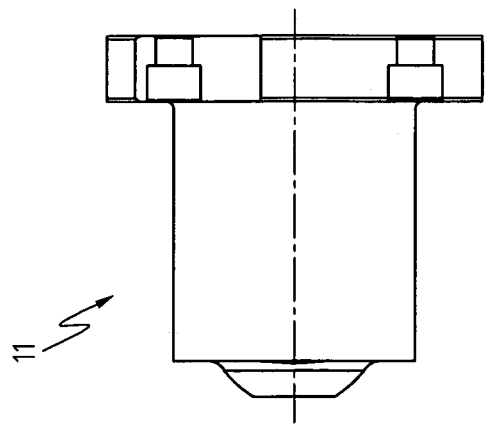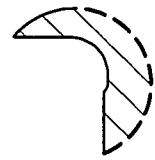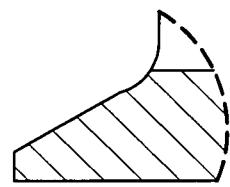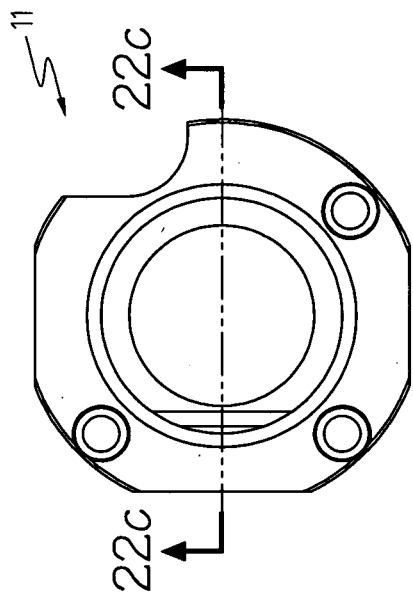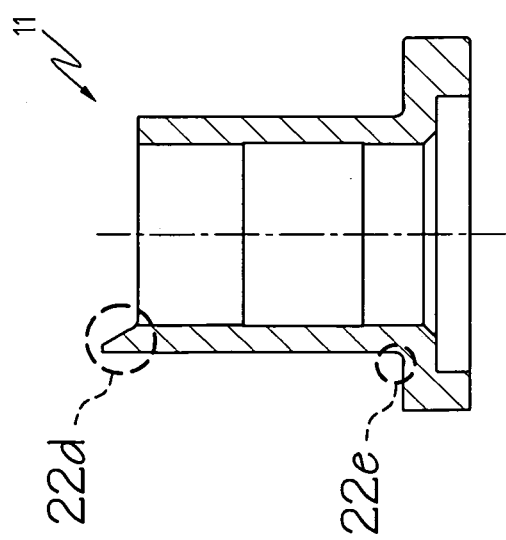
FIG. 22b
FIG. 22e
FIG. 22d
FIG. 22a
FIG. 22c

SYSTEMS AND METHODS FOR MOBILE AND/OR MODULAR MANUFACTURING

CROSS REFERENCE TO RELATED APPLICATIONS

This application is a non-provisional of U.S. Application Ser. No. 60/940,309 filed May 25, 2007 entitled System and Method of Mobile Manufacturing, which is herein incorporated by reference in its entirety.

FIELD OF THE INVENTION

The present invention generally relates to systems and methods for mobile and/or modular manufacturing. More particularly, the present invention relates to systems and methods for mobile and/or modular manufacturing that are scaleable and de-scaleable based upon the production requirements of the manufacturing facility.

SUMMARY OF THE INVENTION

Accordingly, the present invention is intended to address and obviate problems and shortcomings and otherwise improve manufacturing processes.

In one exemplary embodiment of the present invention, a method of manufacturing, that includes identifying a customer's production requirements at the customer's production facility, designing a manufacturing cell based upon the identified production requirements, delivering components for the manufacturing cell to a location at or near the customer's production facility, assembling the components to form the manufacturing cell at the location, and training operational personnel to operate the manufacturing cell.

In another exemplary embodiment of the present invention, a method of preform manufacturing comprises identifying a customer's preform production requirements at the customer's production facility, designing a preform injection mold manufacturing cell based upon the identified preform production requirements, delivering components for the preform injection mold manufacturing cell to a location at or near the customer's production facility, assembling the components to form the preform injection mold manufacturing cell at the location, and training operational personnel to operate the preform injection mold manufacturing cell.

BRIEF DESCRIPTION OF THE FIGURES

The following detailed description of exemplary embodiments of the present invention can be best understood when read in conjunction with the following drawings, where like structure is indicated with like reference numerals and in which:

FIG. 3b is a side elevational view of the core side of the Preform Mold System and the injection mold machine of FIG. 3a;

FIG. 3c is a front view of the core side of the Preform Mold System and the injection mold machine of FIG. 3a;

FIG. 4b is a side elevational view of the cavity side of the Preform Mold System connected to the stationary platen of FIG. 4a;

FIG. 4c is a front view of the cavity side of the Preform Mold System connected to the stationary platen of FIG. 4a;

FIG. 6a is a perspective view of an exemplary embodiment of a core side module of the Preform Mold System according to the present invention;

FIG. 6b is a top plan view of the core side module of FIG. 6a;

FIG. 6c is a cross sectional view of the core side module taken along 6c-6c of FIG. 6b;

FIG. 6d is a cross sectional view of the core side module taken along 6d-6d of FIG. 6b;

FIG. 7a is a perspective view of an exemplary embodiment of a cavity side module of the Preform Mold System according to the present invention;

FIG. 7b is a top plan view of the cavity side module of FIG. 7a;

FIG. 7c is a cross sectional view of the cavity side module taken along 7c-7c of FIG. 7b;

FIG. 7d is a cross sectional view of the cavity side module taken along 7d-7d of FIG. 7b;

FIG. 8b is a cross sectional view of the preform mold stack-up taken along 8b-8b of FIG. 8a;

FIG. 9b is an exploded view of the ejector housing assembly of FIG. 9a;

FIG. 9c is a side elevational of the ejection housing assembly of FIG. 9a;

FIG. 9d is a top plan view of the ejection housing assembly of FIG. 9a;

FIG. 10b is a side elevational of the cavity portion of FIG. 10a;

FIG. 10c is a top plan view of the cavity portion of FIG. 10a;

FIG. 10d is a bottom plan view of the cavity portion of FIG. 10a;

FIG. 11b is a bottom plan view of the thread split of FIG. 11a;

FIG. 11c is a side elevational of the thread split of FIG. 11a;

FIG. 11d is a top plan view of the thread split of FIG. 11a;

FIG. 12a is a top plan view of an exemplary embodiment of a cavity plate of the cavity side module of FIG. 7a;

FIG. 12b is a bottom plan view of the cavity plate of FIG. 12a;

FIG. 12c is a detail view of the cavity plate taken at A of FIG. 12a;

FIG. 12d is a detail view of the cavity plate taken along 12c-12c of FIG. 12a;

FIG. 12e is a detail view of the cavity plate taken along 12d-12d of FIG. 12a;

FIG. 13a is a perspective view of an exemplary embodiment of an ejector plate of the core side module of FIG. 6a;

FIG. 13b is a top plan view of the ejector plate of FIG. 13a;

FIG. 13c is a side elevational view of the ejector plate of FIG. 13a;

FIG. 14a is a perspective view of an exemplary embodiment of a core plate of the core side module of FIG. 6a;

FIG. 14b is a top plan view of the core plate of FIG. 14a;

FIG. 15a is a top plan view of an exemplary embodiment of a left carrier plate of the core side module of FIG. 6a;

FIG. 15b is a side elevational view of the left carrier plate of FIG. 15a;

FIG. 15c is a bottom plan view of the left carrier plate of FIG. 15a;

FIG. 16a is a top plan view of an exemplary embodiment of a right carrier plate of the core side module of FIG. 6a;

FIG. 16b is a side elevational view of the right carrier plate of FIG. 16a;

FIG. 16c is a bottom plan view of the right carrier plate of FIG. 16a;

FIG. 17b is a cross section view of the first half section of the clamp plate taken along 17b-17b of FIG. 17a;

FIG. 17c is a cross section view of the first half section of the clamp plate taken along 17c-17c FIG. 17a;

FIG. 20a is a top plan view of an exemplary embodiment of a wear plate of the core side module of FIG. 6a;

FIG. 20b is a side elevational view of the wear plate of FIG. 20a;

FIG. 21a is a top plan view of an exemplary embodiment of a gib of the core side module of FIG. 6a;

FIG. 21b is a side elevational view of the gib of FIG. 21a;

FIG. 21c is a front view of the gib of FIG. 21a;

FIG. 22a is top plan view of an exemplary embodiment of a core sleeve of the core side module of FIG. 6a;

FIG. 22b is a side elevational view of the core sleeve of 22a;

FIG. 22c is a cross sectional view of the core sleeve taken along 22c-22c of FIG. 22a;

FIG. 22d is a detail of the core sleeve taken at 22d of FIG. 22c;

FIG. 22e is a detail of the core sleeve taken at 22e of FIG. 22c;

FIG. 23a is top plan view of an exemplary embodiment of a filler plate of the cavity side module of FIG. 7a;

FIG. 23b is a front view of the filler plate of 23a; and

FIG. 23c is a side elevational view of the filler plate of FIG. 23a.

Figure 1:
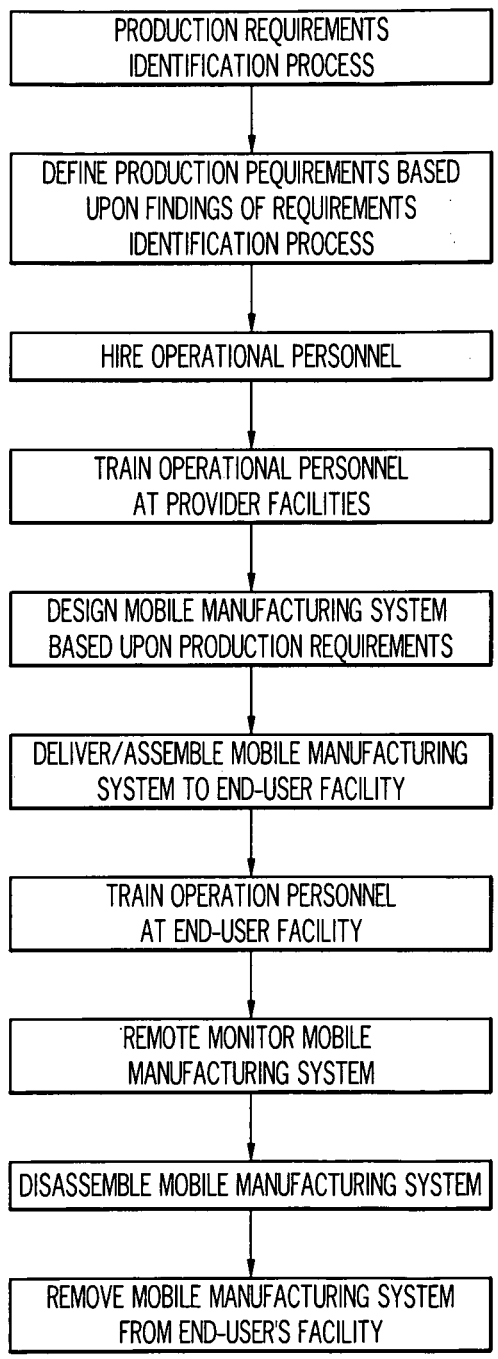
FIG. 1 is a flow diagram of an exemplary embodiment of a method for mobile manufacturing according to the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

The following text sets forth a broad description of numerous different embodiments of the present invention. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present invention generally relates to systems and methods for manufacturing. More particularly, the present invention relates to systems and methods for mobile and/or modular manufacturing that is scaleable and/or de-scaleable based upon the changing requirements of the production facility. Even more particularly, the present invention relates to systems, methods, and/or a business model for mobile and/or modular plastic preform manufacturing at or near the customer's facility.

The present invention may be a customized, adaptable, mobile, portable, and flexible manufacturing system and method (e.g., preform injection molding system) operable to be located at a customer's facilities (i.e., on-site) or near the customer's facilities (e.g., warehouse or production facilities near customer's facility). The present invention is highly capable of producing products for the customer on-site or near the customer's facilities (near on-site), with no in-house investment, personnel, or expertise required. The system and method of the present invention may comprise a method of integrating mobile preform manufacturing modules, which can be quickly located within or in close proximity to a customer's (or supplier's) site or facility and enabling flexible, low-cost, high volume, highly adaptable production capabilities (capable of manufacturing a variety of preform sizes, shapes, and numbers, simultaneously or sequentially).

The present invention may eliminate the need for the traditional large plant infrastructure and corresponding capital investment expenditures. The present invention also may enable the reduction and/or elimination of the supply chain and/or costs due to packaging, shipping, and fuel. Also, the present invention provides for an improved level of support and services that may be real-time or just-in-time compared with a traditional large plant that is located across the state or country.

The complete system offers the customer quality manufactured products (e.g., preforms/parisons), services, and support (the "products") matched to the unique user's requirements. The system and method's mobility attribute supports quick expansion, relocation, and/or reduction capabilities.

As used herein, the term 'manufacturing cell' means a manufacturing cell that is mobile and/or modular such that components of the manufacturing cell may be transported to or near a customer's production facility and assembled into a functioning manufacturing cell such as a preform injection molding process. The manufacturing cell may be quickly and efficiently scaleable or de-scaleable based upon the changing customer production requirements. When the customer no longer requires the manufacturing cell at or near its production facility, the manufacturing cell may be disassembled and removed from the location.

As used herein, the terms 'preform' and 'parison' mean a test tube shaped part produced by injection mold systems, as known to one of ordinary skill in the art, in a first step of a two-stage injection molding and blow molding process used to produce bottles or containers. The injection molding of a preform/parison may be performed in an injection mold machine as known to one of ordinary skill in the art. In the preform, the bottle-cap threads are already molded into place, and the body of the tube is significantly thicker, as it will be inflated into its final shape in the second step using stretch-blow molding. In a second process, the preforms are heated rapidly and then inflated against a two-part mold to form them into the final shape of the bottle or container. In some applications, preforms (uninflated bottles) may be used as containers.

Preform design, as used herein, is defined as a specific shape, size, and/or finish of a preform.

As used herein, the term 'provider' means an entity (e.g., a company, corporation, partnership, or any other corporate form), its employees or representatives, an individual, one or more individuals, sole proprietor, or any combination thereof that provides and/or performs for a customer the systems and methods of the present invention.

An exemplary embodiment of the mobile and modular manufacturing system and method of the present invention that may be provided, assembled, and performed by a provider of such system and method is shown in FIG. 1. In the exemplary method, an extensive requirements determination process is performed with a customer. The Provider may request and then receive from the customer information regarding product requirements and/or specifications, including preform sizes, forecasts, and inventory levels. If the customer does not provide the product requirements and/or specifications, the Provider may also generate production specifications based upon prior history, history of a similar product and drawings, and/or industry standard(s). Additionally, the requirements identification process may include a requirements (and/or specification) identification interview, wherein one or more employees or other representatives of the customer may be extensively interviewed to determine the customer's production and/or manufacturing requirements (e.g., required preform shapes, sizes, volume, materials, etc.) and to learn how the mobile manufacturing system and method of the present invention would best be adapted and/or customized to the specific requirements of the user. The requirements identification interview may include preparing and/or customizing a series of questions to be presented to the customer that are industry-specific and/or customer-specific. Once the product requirements and/or specification(s) are developed and/or determined, the Provider may supply this product specification to the customer for review, comment, and/or approval. If the production involves a colored product, color plagues may be provided to the customer as well.

Following the extensive requirements identification process and/or interview and/or the customer's approval of the product specification, a design team guides, advises, and ultimately creates a mobile and/or modular manufacturing cell (e.g., mobile manufacturing system) to manufacture products (e.g., preforms) at or in near proximity to the customer's site (e.g., production facilities, warehouse, etc.) that meet the customer's requirements for volume, quality, value, and just-in-time availability. This mobile and/or modular manufacturing cell is easily and efficiently scaleable and de-scaleable in response to the changing customer's production demands.

In an exemplary embodiment, the mobile and/or modular manufacturing cell generally may comprise one or more phase production sections and a base systems section comprising system equipment that may be used with the one or more phase production sections as the manufacturing cell is either expanded or reduced in capacity based upon the customer's changing production requirements as will be described in greater detail below with reference to an exemplary embodiment. The mobile and/or modular manufacturing cell may comprise manufacturing machines/equipments, monitoring equipment, monitors, and systems, and/or computers that are modular and designed such that the system may easily and efficiently be modified to adjust capacity of production and shape and size of the product being produced to the changing production requirements of the customer. As such, the exemplary mobile manufacturing system, including the mobile manufacturing cell, utilizes and takes advantage of quick connect/disconnect connections and hoses, snap fit connections, adjustable manifolds, module mold plates/platens, adjustable valve gate systems, and/or any combinations thereof as known to one of ordinary skill in the art. As set forth above, the mobile and/or modular manufacturing cell of the present invention may be configured to produce a variety of different types of products, and thus comprise a variety of different types of machines and/or equipment, including but not limited to injection molding machines, blow molding machines, and/or thermoforming machines.

Figure 2:
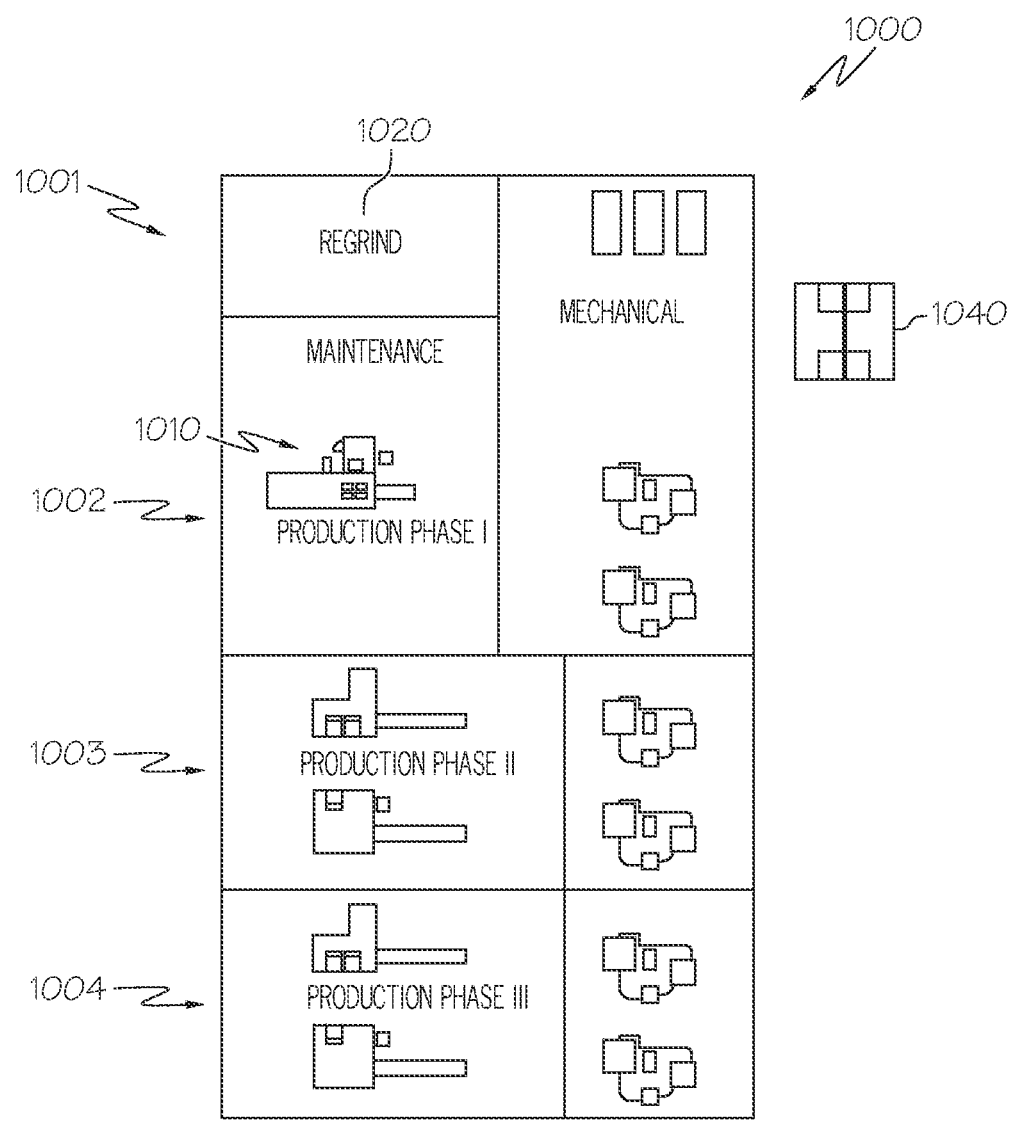
FIG. 2 is a schematic representation of an exemplary embodiment of a mobile and/or modular preform manufacturing cell according to the present invention.

Referring to FIG. 2, an exemplary mobile and/or modular manufacturing cell is shown as mobile and modular preform manufacturing cell 1000. Preform manufacturing cell 1000 may comprise a base systems section 1001 and a phase I production section 1002. Base systems section 1001 may be configured to support phase I production section 1002 and/or one or more additional phase production sections such as a phase II production and phase III production sections as the customer's production requirements change, e.g., grow or reduce.

Base systems section 1001 may comprise one or more electrical switchgear 1030, a process water cooling system 1040, and/or a regrind process 1020. Process water cooling system 1040 provides cooling to the injection machine and molds and a dryer process as known to one of ordinary skill in the art. The injection machine will have a water cooled feed throat section as well as cooling for the hydraulic systems on the machine. These items, along with the return air cooling coils of the dryers, can be operated on a tower water utility. The mold cooling, as well as any chilling requirements for robot preform cooling, will require chilled water. These requirements form the basis of the process cooling water needs.

A tower water system can readily provide cooling water at about 80° F. In this type of cooler, water is recirculated through an atmospheric cooling tower similar to those used at electrical power plans. Although much smaller in size, an industrial tower water system consists of the same elements as a larger one. The tower assembly sprays water through a series of baffles to allow evaporative cooling of the water. As a result, about 3% of the water volume in the system will be lost to evaporation and will require makeup water from the facility water supply. Once the water has been cooled in the tower, it is brought up to pressure in a centrifugal pump. The pump discharge is connected to the distribution piping system and plumbed to the individual use points.

At each device using the cooling water, shutoff valves and appropriate disconnect devices should be used to enable any one item to be isolated from the distribution system. Parallel to the supply water pipe will be a second pipe to return the used water to the cooling tower where the loop starts over. Tower water systems may require the use of additives to control corrosion and limit scale buildup. Since the evaporative tower is open to the elements, a biocide is normally used to prevent the growth of mold and any other microbes that will live in a warm, dark, wet areas. These controls are important to maintain a trouble free water cooling system.

To remove heat from a mold (e.g., modular preform molds), chilled water at about 60° F. may be used to remove the thermal energy in the melted resin. In order to depress the temperature of cooling water below what is available with evaporative cooling methods, a refrigerant based chilling system is employed as known to one of ordinary skill in the art. These systems may use common refrigerants to remove energy from a circulating water system and may typically transfer the excess heat to the tower water system. A chilled water system may employ a refrigerant compressor, air or water cooled condenser for removing the excess energy from the refrigerant, and an evaporator heat exchanger to cool the circulating water. Construction of a chilled water system may employ a single frame to hold the refrigerant system along with the heat exchangers and water circulating pumps. Most packaged commercial systems will have a redundant water pump available for circulating water to avoid system loss due to a pump failure.

Both tower and chilled water systems may use a reservoir tank to equalize the system operating pressure. This tank may be sized based on the total gallons recirculated in the system and will have a make up valve and overflow pipe to manage the water volume in the system. In tower water systems, water conditioners may be necessary and monitored and adjusted based on the amount of makeup water introduced into the system. On chilled water systems the water is trapped in a closed loop so losses are minimal. Proper water condition may be required, but is not subject to the changes of a continuous makeup dilution.

While the mobile manufacturing cell 1000, by its design and operations, may be configured to minimize the production of scrap, there may be times of production loss or off-specification production. This scrap material, which may consist of whole or partial preforms and/or bottles and/or excess material that is cut from the preforms or bottles, may be reground and introduced back into the production process to the greatest extent possible. Regrind process and/or system 1020 as shown in FIG. 2 may be configured to receive all the captured excess plastic from the preform injection mold process and/or blowmolding process, regrind it, and then prepare it to be recycled back into the preform injection mold and/or blowmolding process. The conservation and re-use of raw materials provides the mobile and/or modular manufacturing cell substantial benefits, including but not limited to reducing raw material costs and minimizing the manufacturing cell's impact on the environment.

The selection of a grinder to perform the regrinding of the plastic will be determined based on the production capacity of the mobile manufacturing cell 1000 and whether bottle scrap product will be ground and re-introduced. This analysis of grinding opportunities may be one aspect of the requirements identification process and/or interview conducted with the customer as shown in FIG. 1. Once volume requirements are determined, the grinder may be selected based on its regrind chip size capabilities. The grinder controls the chip size by a selection of a "screen" element that is part of the grinding chamber. These openings will control the size of the regrind. To ensure uniform, free flowing regrind, in one exemplary embodiment, a ⅜" screen size may be used to minimize fine generation in the grinder. A high flow fan may also be added to increase more air flow into the grinder and the grinding process. This will reduce the heat produced during the grinding operation, which may negatively impact regrind quality. The grinder may be any grinder commercially available and as known to one of ordinary skill in the art.

Grinder knives should be kept sharp and properly gapped. The grinding system, of the mobile and/or modular manufacturing cell 1000, may be located as close to the mobile cell as possible. Plastic sheeting curtains, versus hardened walls, separate and protect the manufacturing cell from the grinding system. These curtains will permit easy expansion or disassembly of the grinding operation as required.

The first step of an exemplary regrind process 1020 may comprise the dumping and/or loading of scrap preforms and/or bottles into a hopper (not shown) that feeds a belt conveyor (not shown) going up to the inlet of the grinder. This dumping and/or loading step may comprise an automatic step, wherein the scraps are fed from a conveyor to the hopper and then dumped into the hopper automatically. Alternatively, an operator may manually dump the scraps into the hopper which then supplies the scraps to the belt conveyor that then feeds the scraps to the grinder to be ground. The hopper and the one or more conveyors may be any commercially available hopper and conveyors as known to one of ordinary skill in the art.

Proper illumination along the conveyor may assist in enabling quality inspections and sorting by the operator. The operator may inspect materials and reject any unacceptable product. An installed switch, can divert unacceptable product from the conveyor to an adjacent container, i.e., a deflector chute (not shown). A metal detector may also be installed as part of the in-feed conveyor belt. The metal detector may sense both ferrous and non-ferrous metals. Acceptable material may then pass through the grinder and be discharged into another material conveyor. This conveyor may transport the material to the inlet of a dust removal system. This device uses a counter flow of air to lift the dust particles from the ground granules, allowing the regrind to fall through and go forward in the process. The dust may be pulled off with the air stream and sent to an adjacent dust collector. Once the dedusting stage is complete, the ground material will free fall into a secondary metal detector. As before, a small amount of ground material may be lost with activation of the metal contaminant diverter.

Once the grinding process is complete, the regrind material will be stored, to be re-introduced later in the manufacturing process. Regrind may be stored in boxes or storage surge bins. Base systems section 1001 may also comprise a maintenance section for placement and/or storage of maintenance items.

Phase I production section 1002 may comprise one or more manufacturing or production equipment such as a preform injection mold machine 1010, monitoring sensors, and/or other production equipment. Other exemplary manufacturing equipment that may be included with the mobile and/or manufacturing cell may include, but are not be limited to, injection molding machines, blow molding machines, injection-blow molding machines, thermoforming machines, molds, and/or mold systems, particularly those configured for manufacturing plastic preforms, plastic bottles, containers, and/or other products from the preforms.

Such exemplary manufacturing equipment may comprise molding machines and components shown and describe in one or more of the following U.S. Pat. Nos. 4,202,522; 4,219,323; 4,268,240; 4,330,257; 4,395,222; 4,412,806; 5,533,883; 5,536,164; 5,620,723; 5,738,149; 5,863,485; 6,082,991; 6,123,891; 6,135,757; 6,143,215; 6,220,850; 6,726,465; 6,749,779; and/or 7,037,103, which are all herein incorporated by reference in their entirety. Also, an exemplary embodiment of the mobile manufacturing cell may comprise the mixing method and apparatus for injection molding machines as shown and described in U.S. Patent Application Publication No. 2002/0105113, which is herein incorporated by reference in its entirety. Preform injection mold machine 1010 may comprise a Husky 300 ton injection molding machine or a Husky 600 ton injection molding machine commercially available from Husky Injection Molding Systems Ltd.

Referring to FIGS. 3 thru 23, the system and method of the present invention may also comprise a modular preform mold system 10 (hereinafter "Peform Mold System 10") that is operable to connect to and function with preform injection mold machine 1010 in either a new or retro-fit installation. Preform Mold System 10 may comprise the preform mold system as shown and described in a commonly-owned, co-pending U.S. application Ser. No. 11/829,326 filed Jul. 27, 2007 and titled "Apparatus and Methods For Modular Preform Mold Systems," which is herein incorporated by reference in its entirety.

Preform mold system 10 may be configured to enable flexible, low-cost, high volume, highly adaptable production capabilities (capable of manufacturing a variety of preform sizes, shapes, and numbers, simultaneously or sequentially). This exemplary Preform Mold System in combination with the system and method of the present invention may offer the customer quality manufactured preforms/parisons (the "products") matched to the unique customer's production requirements on-site or in a location in close proximity to the customer's facility. Due to its modularity and flexibility, the system and method of the present invention, including the Preform Mold System 10, reduces and/or eliminates the need for second injection mold machines for molding preforms having a different size, shape, and/or finish (design) simultaneously or without requiring mold change-outs. Thus, the Preform Mold System, as set forth above, reduces or eliminates added capital investment, unused production capacity, and stranded investment. Also, the Preform Mold System 10 permits the injection mold machine to efficiently, cost effectively, and quickly adapt and/or change to the ever changing production requirements of the customer and the market. In one exemplary embodiment of the Preform Mold System (i.e., mold) of the present invention, the Preform Mold System may operate in conjunction with or be retrofitted to a single injection mold machine to simultaneously produce a plurality of preforms (i.e., products) having a multitude of preform designs ("sizes, shapes, and/or finishes") on this single injection mold machine.

Figure 3A:
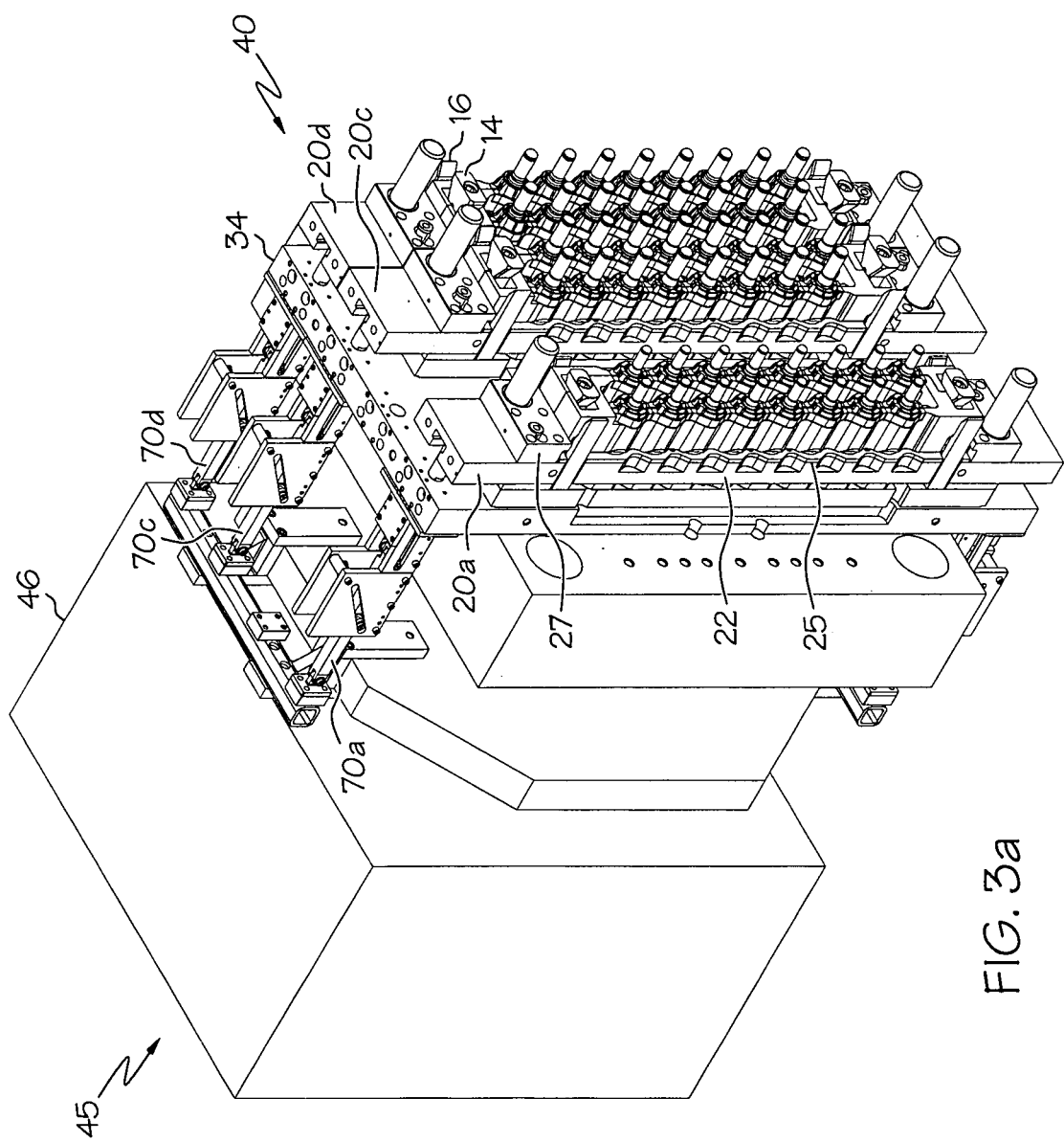
FIG. 3a is a perspective view of an exemplary embodiment of a core side of a Preform Mold System according to the present invention connected to a core side of an injection mold machine.
Figure 4A:
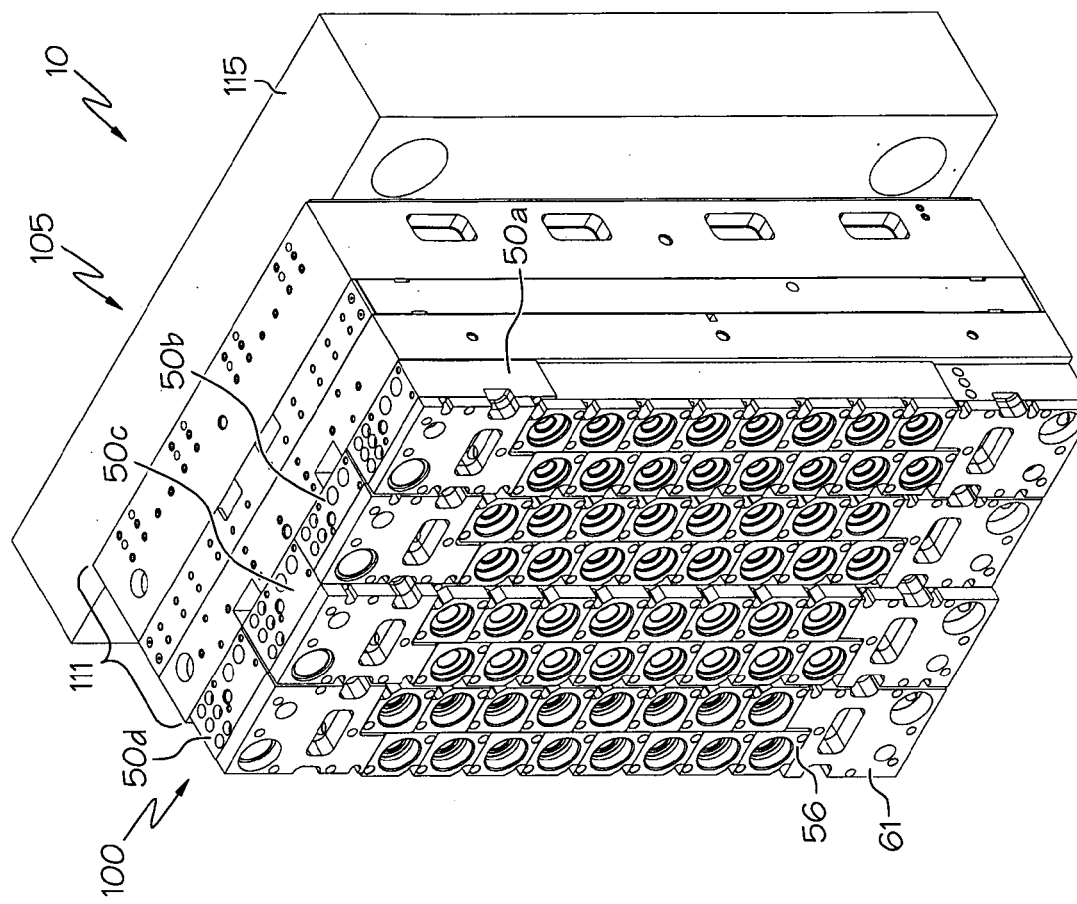
FIG. 4a is a perspective view of an exemplary embodiment of a cavity side of a Preform Mold System of according to the present invention connected to a cavity side stationary platen of an injection mold machine.
Figure 4B:
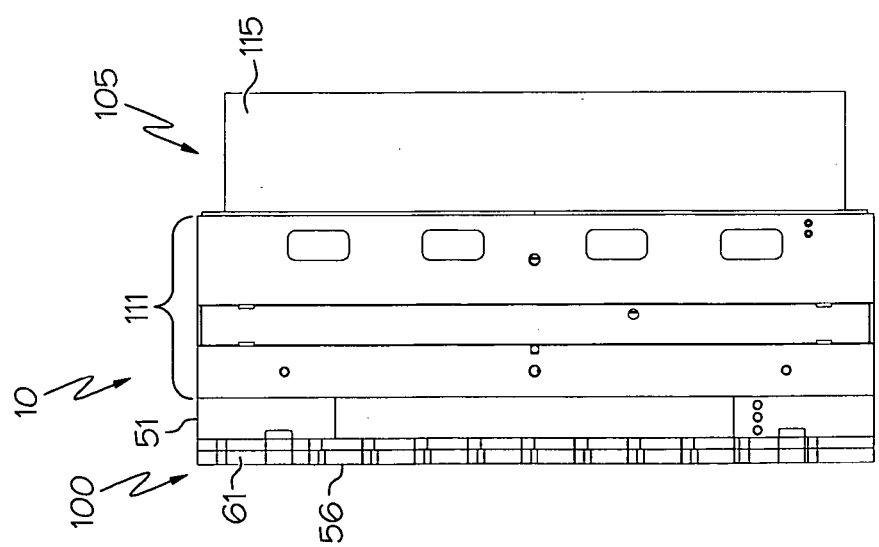
Figure 4C:
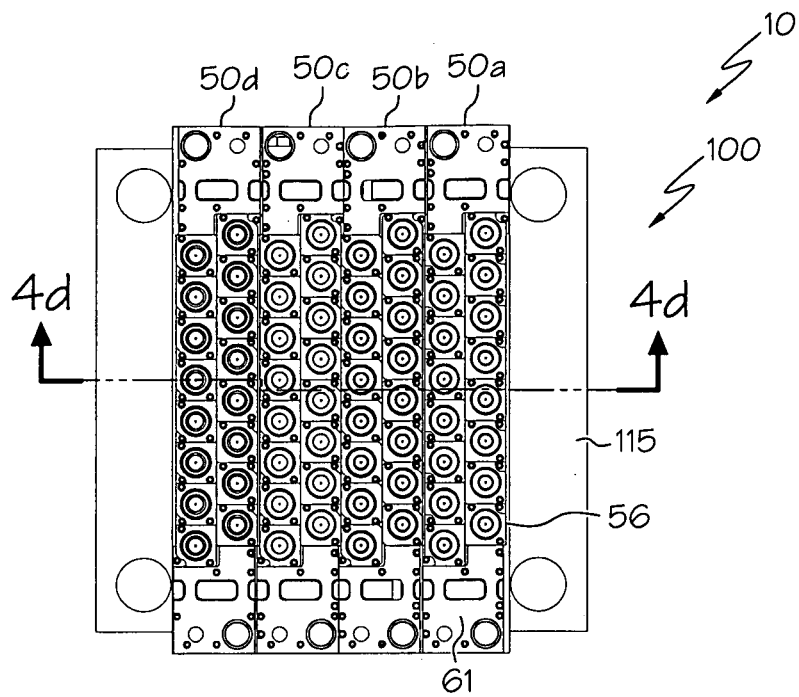
Figure 4D:
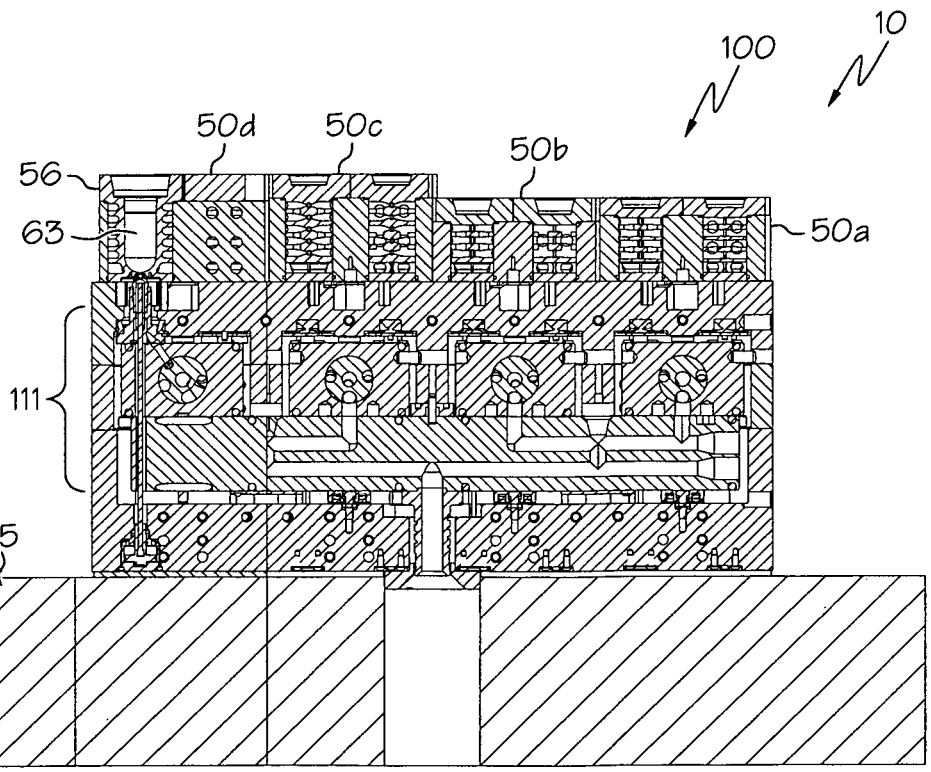
FIG. 4d is a cross sectional view of the cavity side of the Preform Mold System connected to the stationary platen taken along 4d-4d of FIG. 4c.

Preform Mold System 10 generally comprises a core side 40 (e.g., FIGS. 3, 5, and 6) and a corresponding cavity side 100 (e.g., FIGS. 3 and 7). The Preform Mold System 10 of the present invention may include multiple preform core side modules 20 (e.g., a first core side module 20*a*, a second core side module 20*b*, a third core side module 20*c*, a fourth core side module 20*d*), multiple cavity side modules 50 (e.g., a first cavity side module 50*a*, a second cavity side module 50*b*, a third cavity side module 50*c*, a fourth cavity side module 50*d*) corresponding to the respective core side modules 20, a core side clamp plate 34 operable to receive and connect to one or more of core side modules 20, wherein the multiple core side modules 20 and the respective multiple cavity side modules 50 are designed and/or operable to matingly engage one another to form multiple preform mold stack-up modules having multiple preform molds 67. Also, Preform Mold System 10 may, optionally, include a manifold and valve gate assembly 111 operable to receive and connect to one or more of cavity side modules 50 and to control and direct the injection of fluidized plastic into each preform mold 67 disposed within each mold stack-up module of the present invention that is actually connected to clamp plate 34 and manifold and valve gate assembly 111.

Also, Preform Mold System 10 may comprise an ejector housing assembly 70 (e.g., a first ejector housing assembly 70*a*, a second ejector housing assembly (not shown), a third ejector housing assembly 70*c*, a fourth ejector housing assembly 70*d*) for each the core side module 20 (e.g., 20*a*, 20*b*, 20*c*, 20*d*). Each ejector housing assembly 70 connects between core side clamp plate 34 and an ejector platen 42 of a core side 45 of injection mold machine 1010 and connects to each core side module 20*a*, 20*b*, 20*c*, 20*d*.

Generally, preform injection mold machine 1010 comprises a core side 45 and a cavity side ("hot side") 105 as known to one of ordinary skill in the art. For illustrations purposes only, and not limitation, FIG. 3 shows an exemplary embodiment of core side 40 of Preform Mold System 10 connected to core side 45 of injection mold machine 1010. Specifically, clamp plate 34 is operable to receive and connect to one or more of core side modules 20 (e.g., 20*a*, 20*b*, 20*c*, 20*d*) and connects the core side modules to a moving platen 44 of core side 45 of injection mold machine 1010. Specifically, core side modules 20 are connected to clamp plate 34 using bolts that are connected into bolt holes disposed within clamp plate 34. The bolts and bolt holes are positioned such that they are accessible in the press of the injection mold machine. Such easy bolt on and off connectivity of core side modules 20 from clamp plate 34 of Preform Mold System 10 provide quick mold change out and adaptability capabilities to injection mold machine 1010, thus reducing long production down times due to lengthy mold change outs. Clamp plate 34 of the present invention is connected to moving platen 44 of the injection mold machine using toe clamps as known to one of ordinary skill in the art.

As shown in FIG. 1, three core side modules 20a, 20c, 20d are shown attached to the core side clamp plate 34, leaving an open position B on clamp plate 34 available to receive second core side module 20b if desired, although not required to run the system to mold preforms. Although the exemplary embodiment only shows clamp plate 34 configured to receive and/or connect to four core side modules 20a, 20b, 20c, 20d, it is understood that the core side clamp plate may be configured to receive a plurality of core side modules, depending upon the preform design, number of preform cores 6 per module, etc. For example, clamp plate 34 shown in FIG. 1 may be replaced with a different clamp plate (not shown) configured to receive and/or connect to up to six core side modules.

Also for illustration purposes only, and not limitation, FIG. 2 shows an exemplary embodiment of cavity side 100 of Preform Mold System 10 connected to a cavity side 105 of injection mold machine 1010. Specifically, manifold and valve gate assembly 111 is operable to receive one or more of cavity side modules 50 (e.g., 50a, 50b, 50c, 50d) and connect the modules 50 to a stationary platen 115 of cavity side 105 of the injection mold machine. Manifold and valve gate assembly 111 also places the cavity side modules 50a, 50b, 50c, 50d in fluid communication with an injector (not shown) of the injection mold machine. In addition, manifold and valve gate 111 is operable to distribute and control from the injector a uniform flow of fluidized plastic to each preform mold 67 of each attached preform mold stack-up module. Manifold and valve gate assembly 111 is balanced as known to one of ordinary skill in the art to deliver the same pressure to each preform mold 67 of the Preform Mold System 10. Although the exemplary embodiment only shows four cavity side modules 50a, 50b, 50c, 50d connected to and in fluid communication with manifold and valve gate assembly 111, it is understood that the manifold and valve gate assembly 111 may be configured and operable to receive any number of cavity side modules 50, depending upon the preform design, number of preform cavities 56 per module, and size of the injection mold machine. For example, manifold and valve gate assembly 111 shown in FIG. 2 may receive up to six cavity side modules 50.

Manifold and valve gate assembly 111 are designed to modify and control the fluidized plastic's flow from the injection mold machine to each preform mold 67. When combined with the machine parameters for injection pressure, melt temperature, and other injection and operational parameters the Preform Mold System 10 of the present invention enables a single injection mold machine to inject fluidized plastic into each distinctly sized, shaped, and/or finished preform mold 67 (e.g., core/cavity combination) in a uniform flow. As such, Preform Mold System 10 is capable of molding (or forming) multiple preform designs simultaneously with a single injection mold machine.

As known to one of ordinary skill in the art and schematically shown in FIG. 1, core side 45 of the injection mold machine also may comprise a clamp unit 46 connected to both an ejector platen 42 and moving platen 44. The injection mold machine may include an ejector activation system (not shown) that are connected to ejector platen 42, and may or may not be connected to ejector housing assemblies 70 of the present invention. It is understood that a variety of commercially available injection mold machines as known to one of ordinary skill in the art may be used with Preform Mold System 10 of the present invention, including but not limited to molding machines and components shown and describe in one or more of the following U.S. Pat. Nos. 4,202,522; 4,219,323; 4,268,240; 4,330,257; 4,395,222; 4,412,806; 5,533,883; 5,536,164; 5,620,723; 5,738,149; 5,863,485; 6,082,991; 6,123,891; 6,135,757; 6,143,215; 6,220,850; 6,726,465; 6,749,779; and/or 7,037,103, which are all herein incorporated by reference. Two exemplary molding machines that the Preform Mold System 10 of the present invention may be operable to connect to and function with includes, but are not limited to, a HUSKY 300 ton injection mold machine or a HUSKY 600 ton injection mold machine commercially available from HUSKY Injection Molding Systems Ltd.

Figure 5:
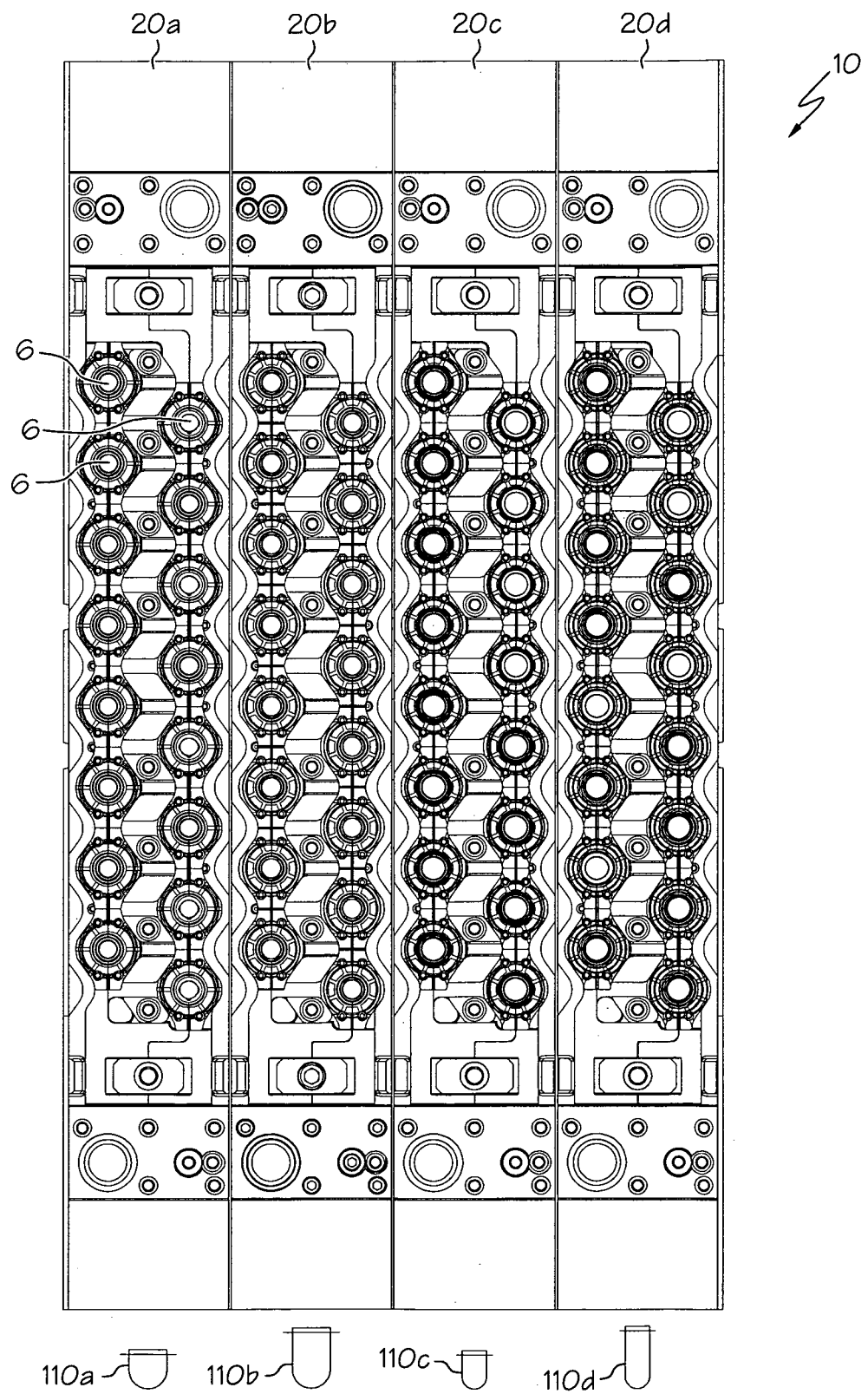
FIG. 5 is a front view of an exemplary embodiment of four core side preform mold modules according to the present invention, wherein each of the core side preform modules are configured for a different preform design.
Figure 8A:
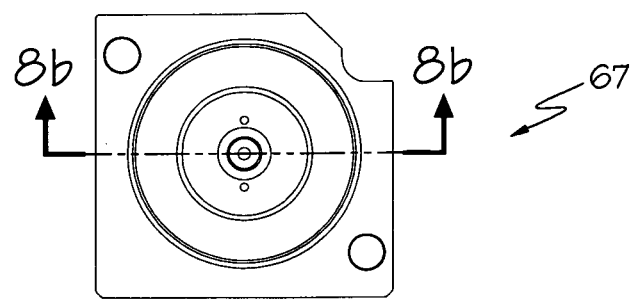
FIG. 8a is a top plan view of an exemplary embodiment of a single preform mold stack-up according to the present invention, wherein a core is inserted into a cavity to form a preform mold.
Figure 8B:
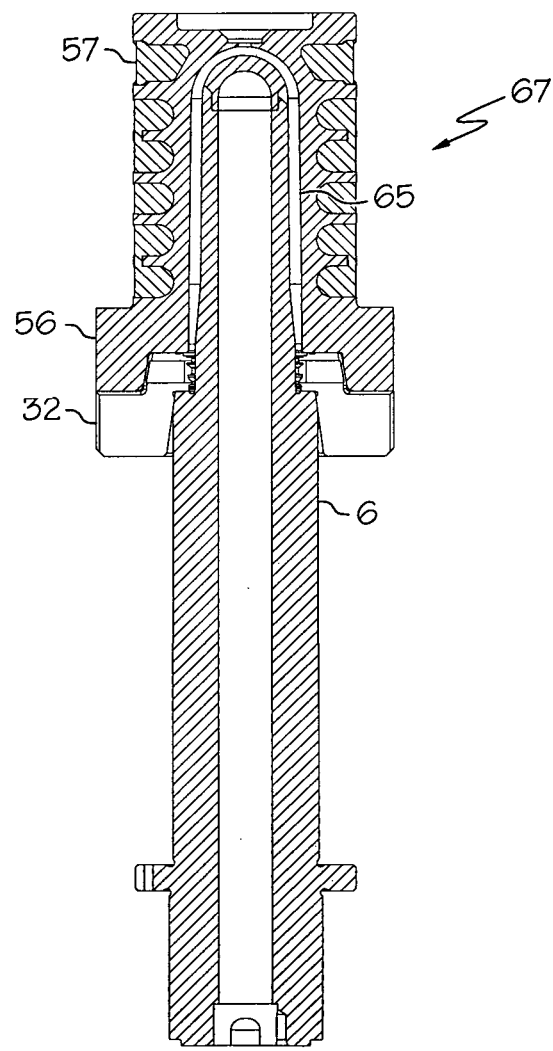
Figure 9C:
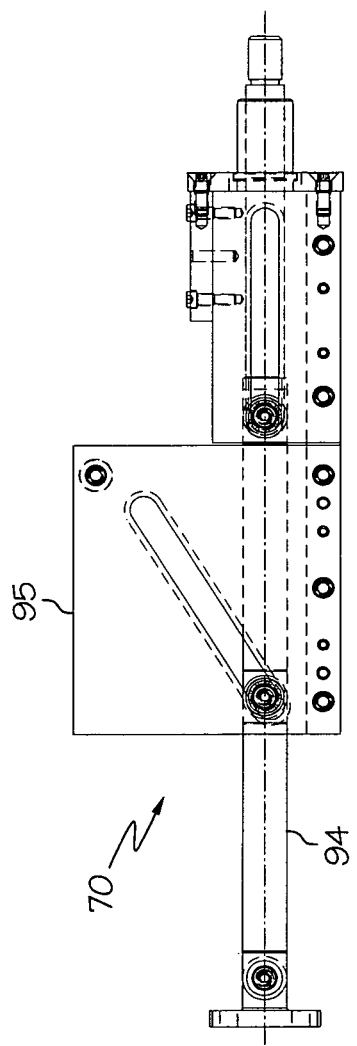
Figure 9A:
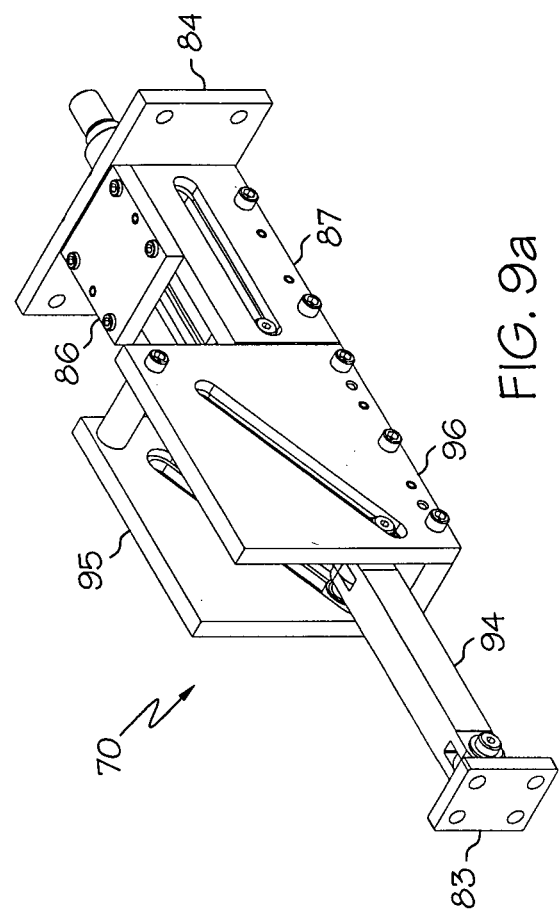
FIG. 9a is a perspective view of an exemplary embodiment of an ejector housing assembly according to the present invention.
Figure 9D:
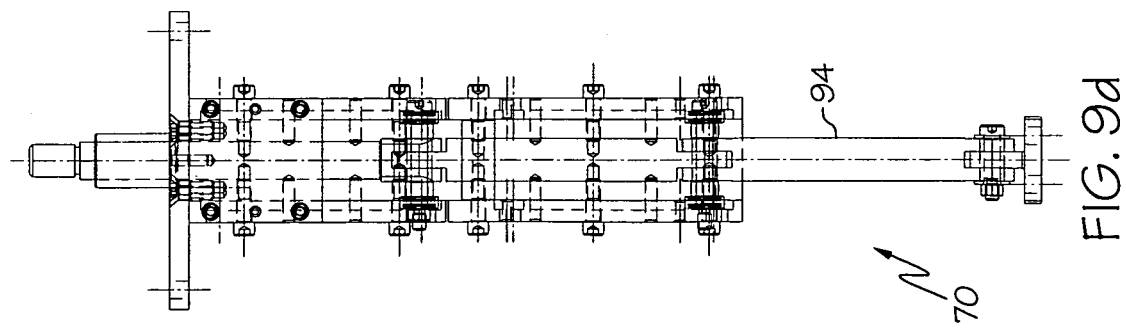
Figure 9B:
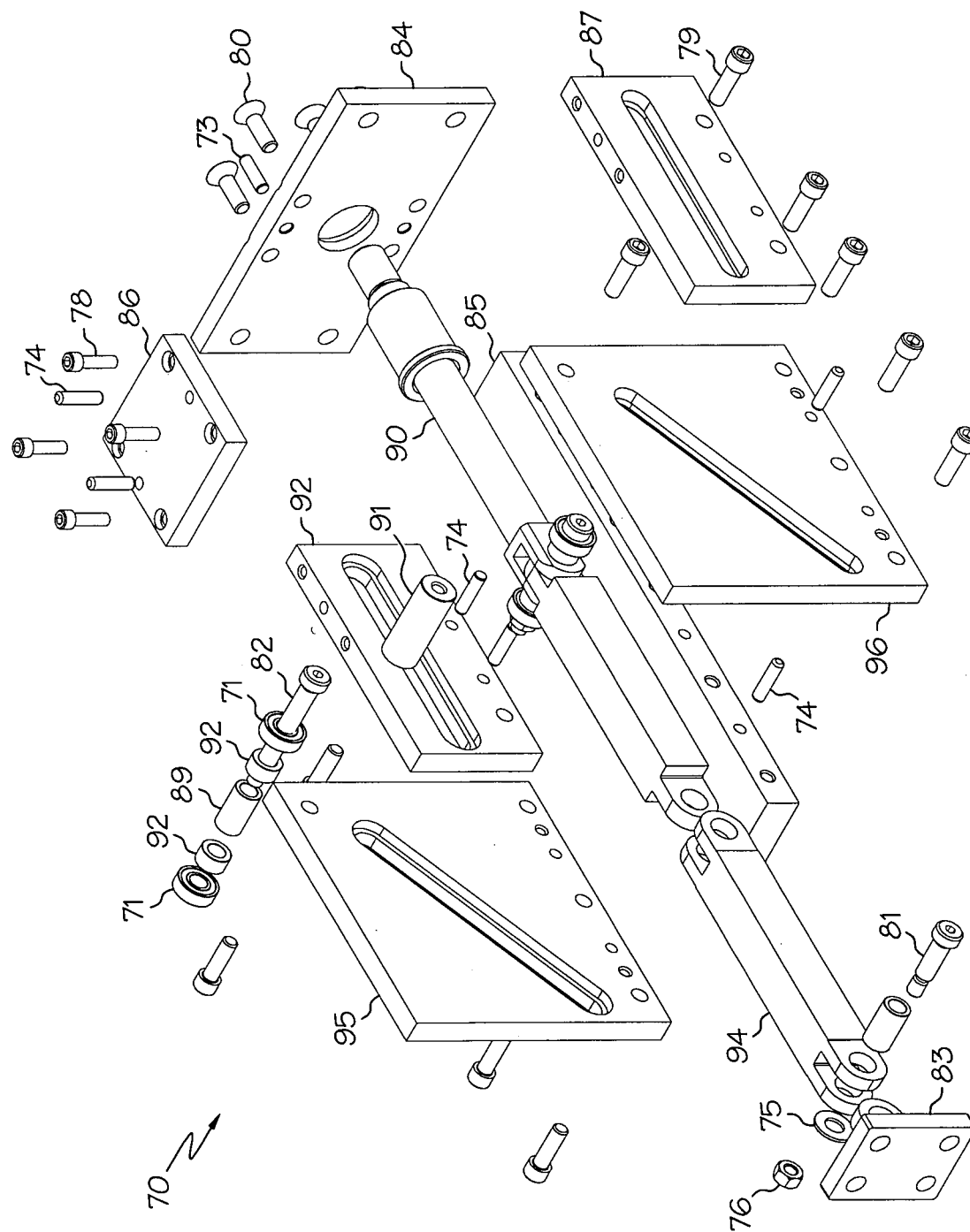
Figure 10A:
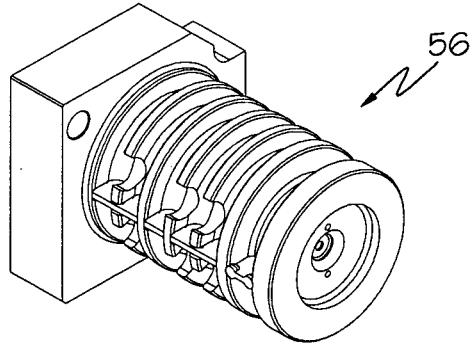
FIG. 10a is a perspective view of an exemplary embodiment of a cavity portion of the cavity side module according to the present invention.
Figure 10B:
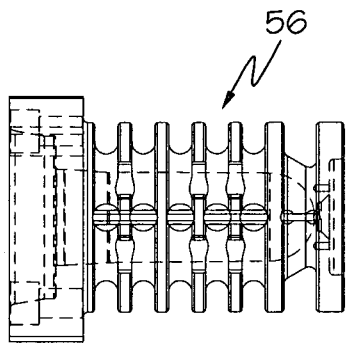
Figure 10C:
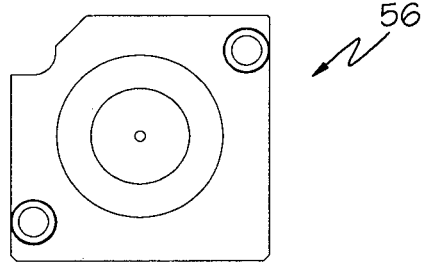
Figure 10D:
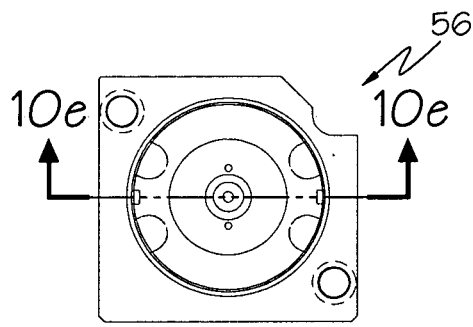
Figure 10E:
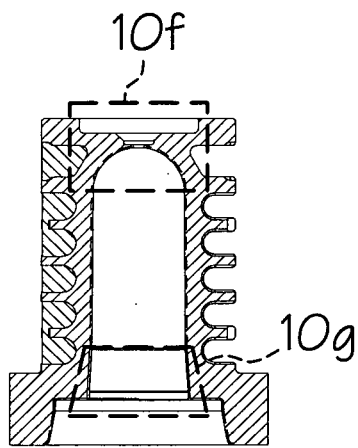
FIG. 10e is a cross sectional view of the cavity portion taken along 10e-10e of FIG. 10d.
Figure 10F:
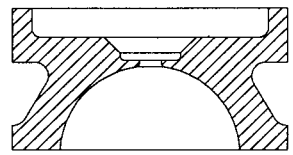
FIG. 10f is a detail view of the cavity portion taken at 10f of FIG. 10e.
Figure 10G:
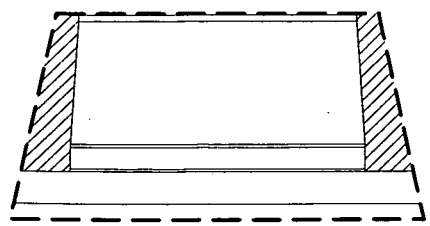
FIG. 10g is a detail view of the cavity portion taken at 10g of FIG. 10e.
Figure 11A:
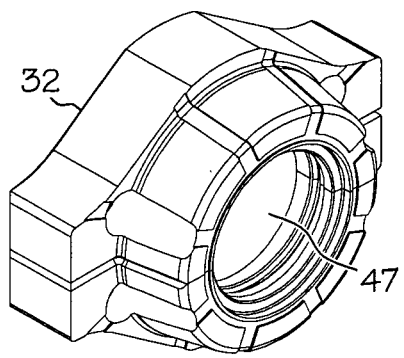
FIG. 11a is a perspective view of an exemplary embodiment of a thread split according to the present invention.
Figure 11B:
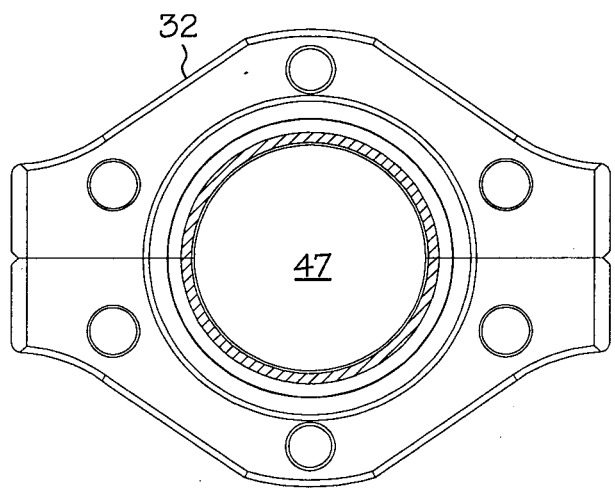
Figure 11C:
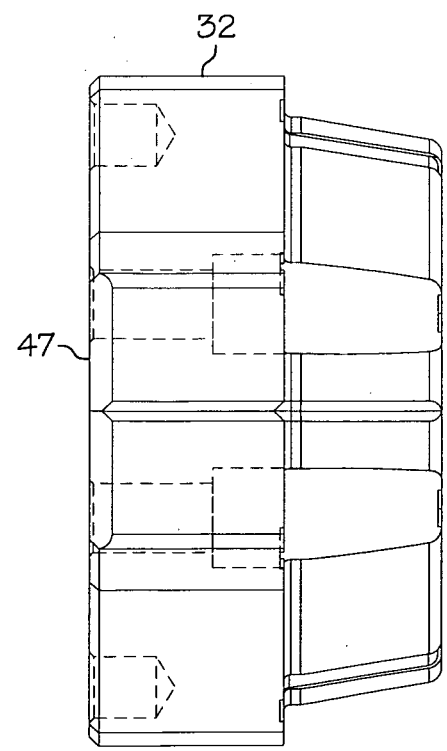
Figure 11D:
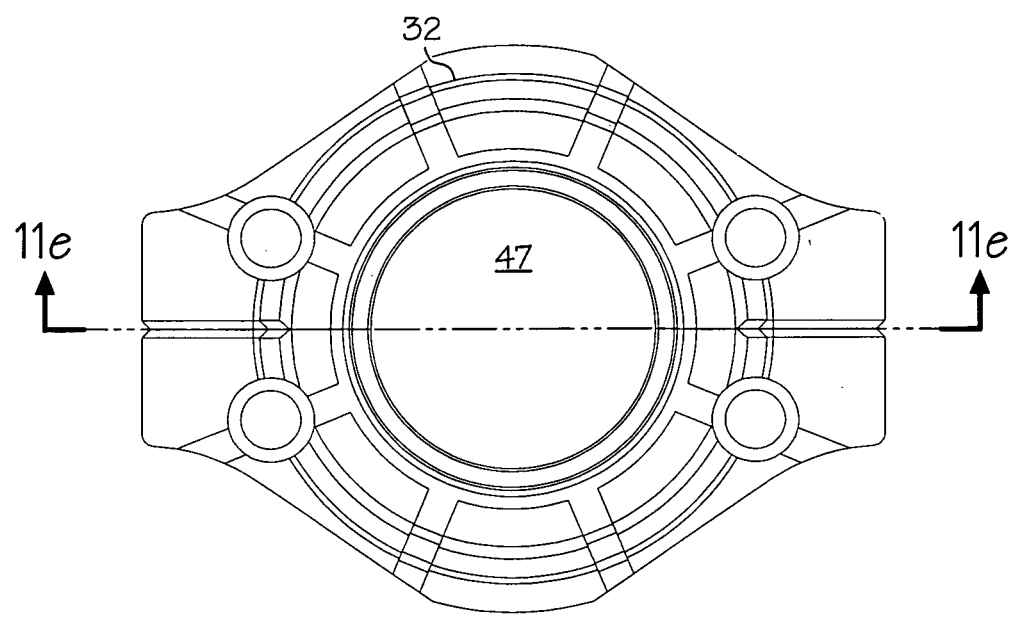
Figure 11E:
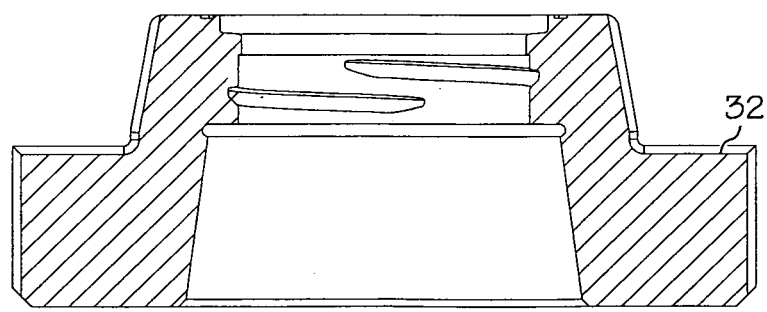
FIG. 11e is a cross sectional view of the thread split taken along 11e-11e of FIG. 11d.
Figure 12D:
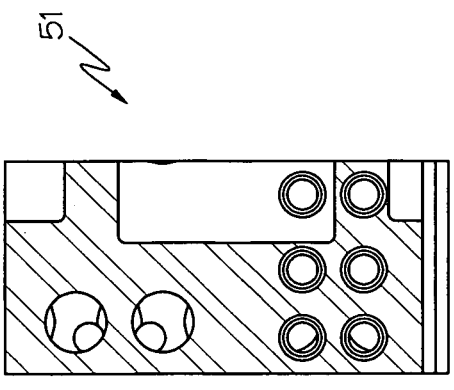
Figure 12E:
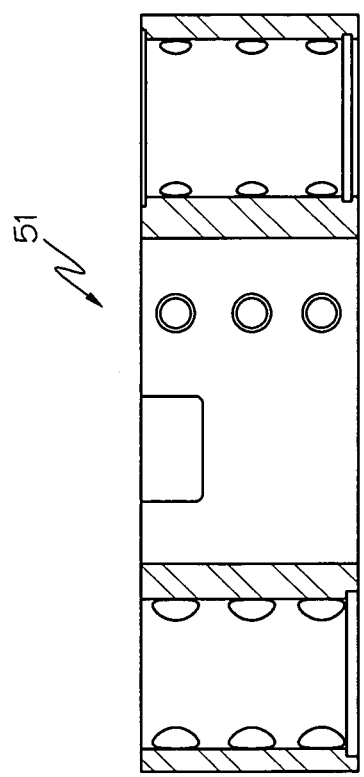
Figure 12C:
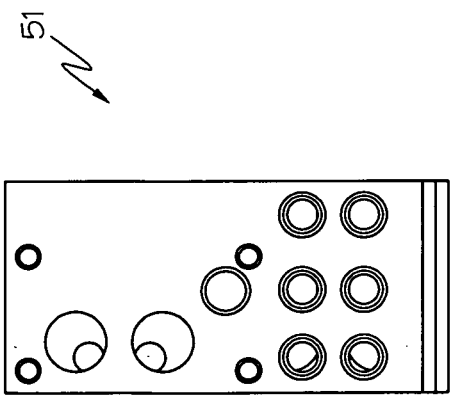
Figure 13A:
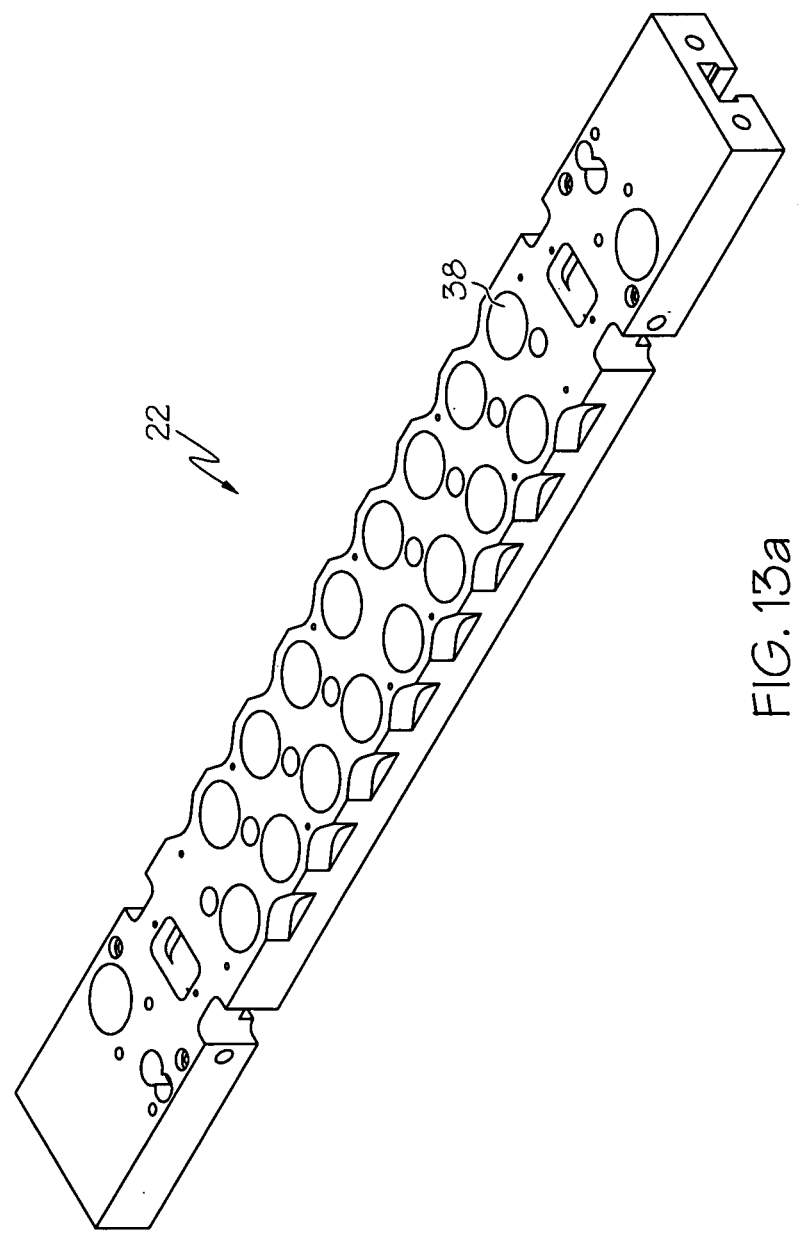
Figure 13F:
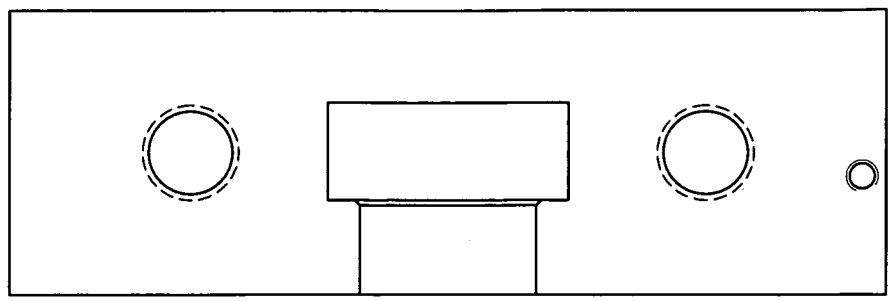
FIG. 13f is a cross sectional view of the ejector plate taken along 13f-13f of FIG. 13b.
Figure 13E:
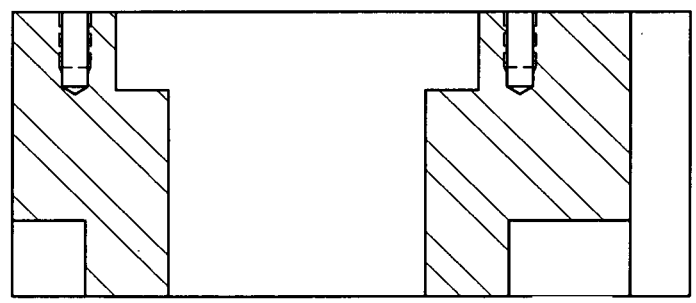
FIG. 13e is a cross sectional view of the ejector plate taken along 13e-13e of FIG. 13b.
Figure 13D:
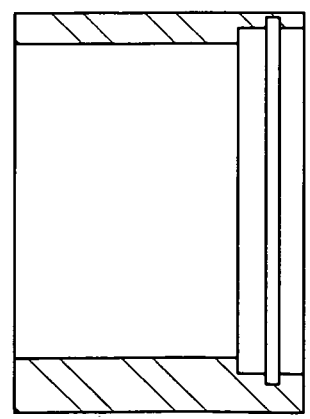
FIG. 13d is a cross sectional view of the ejector plate taken along 13d-13d of FIG. 13b.
Figure 14A:
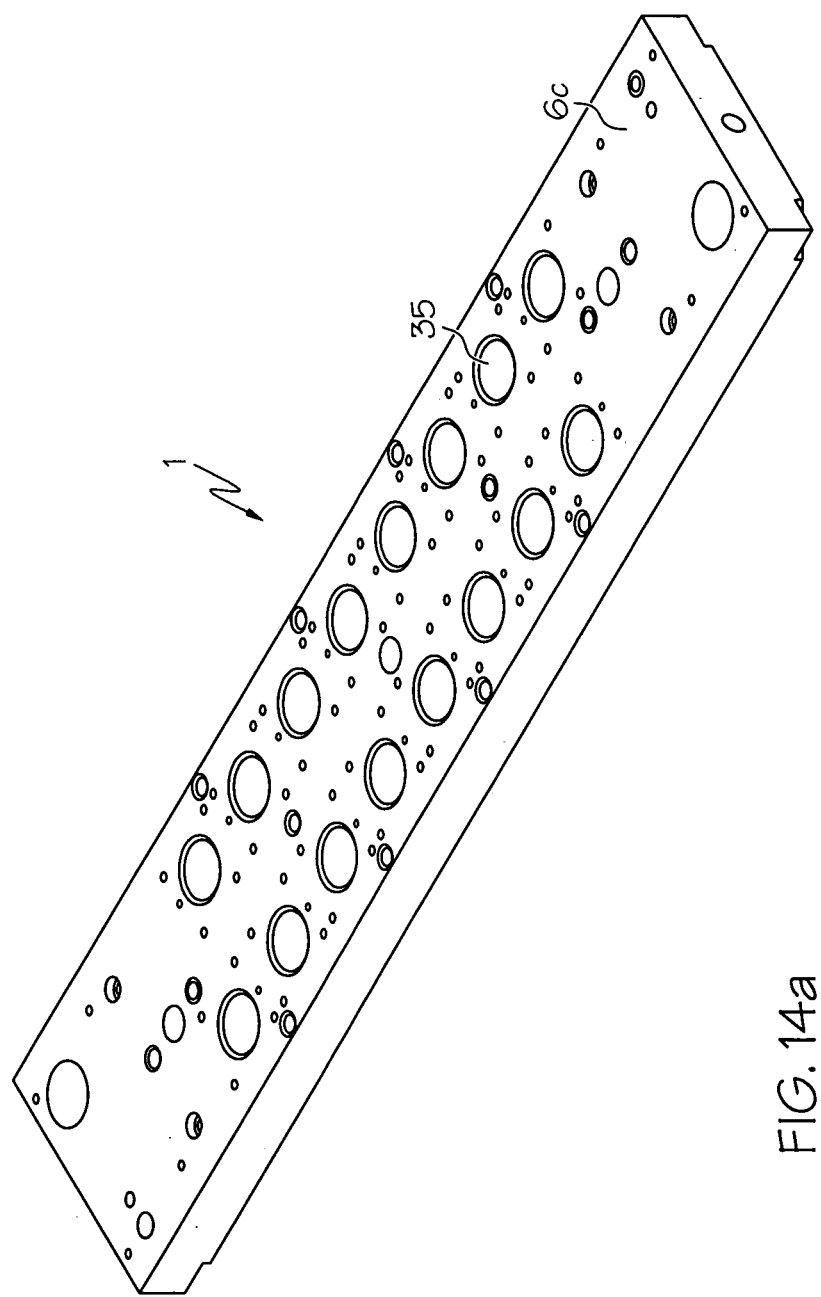
Figure 14B:
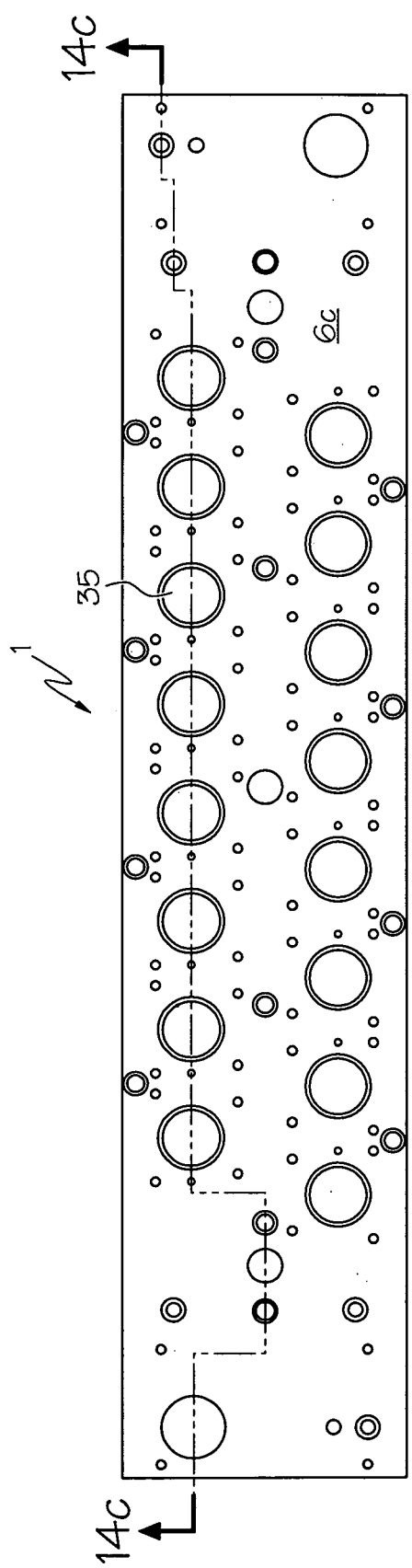
Figure 14C:
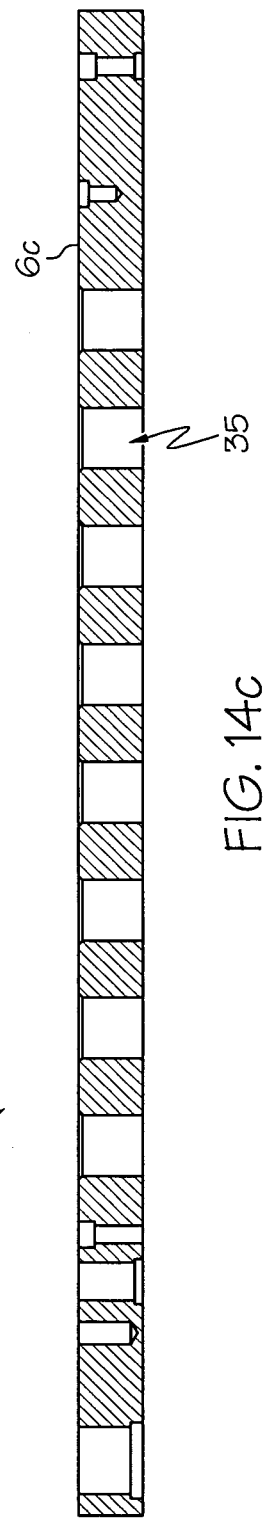
FIG. 14c is a cross sectional view of the core plate taken along 14c-14c of FIG. 14b.
Figure 15C:
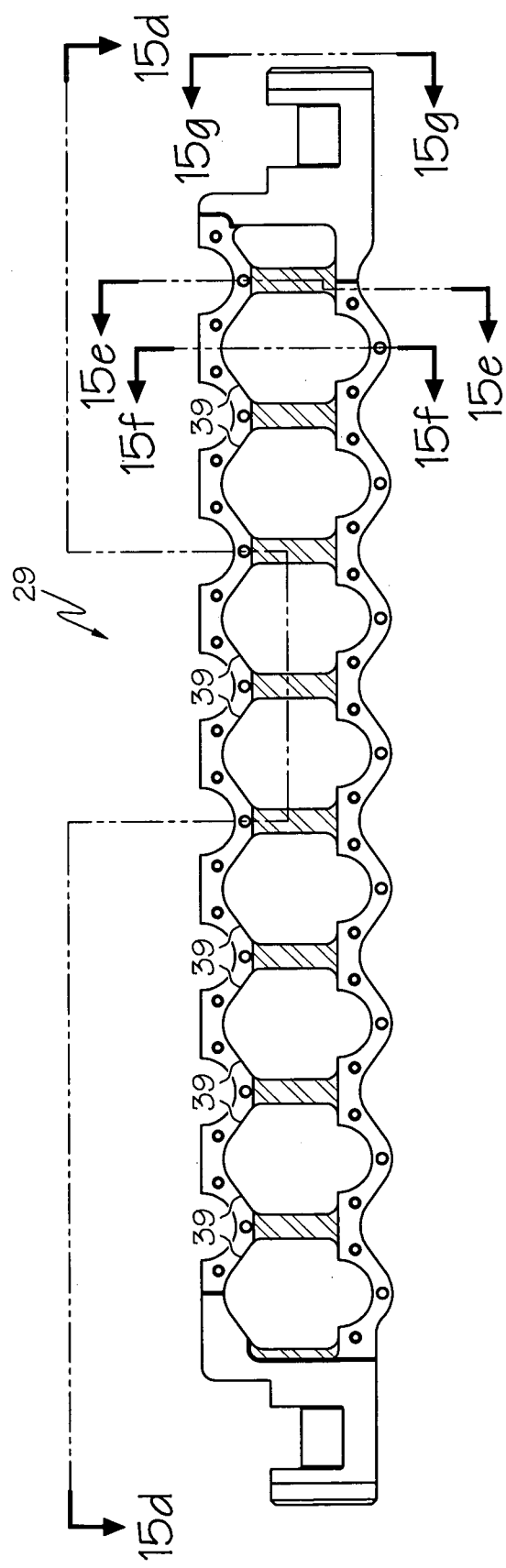
Figure 15D:
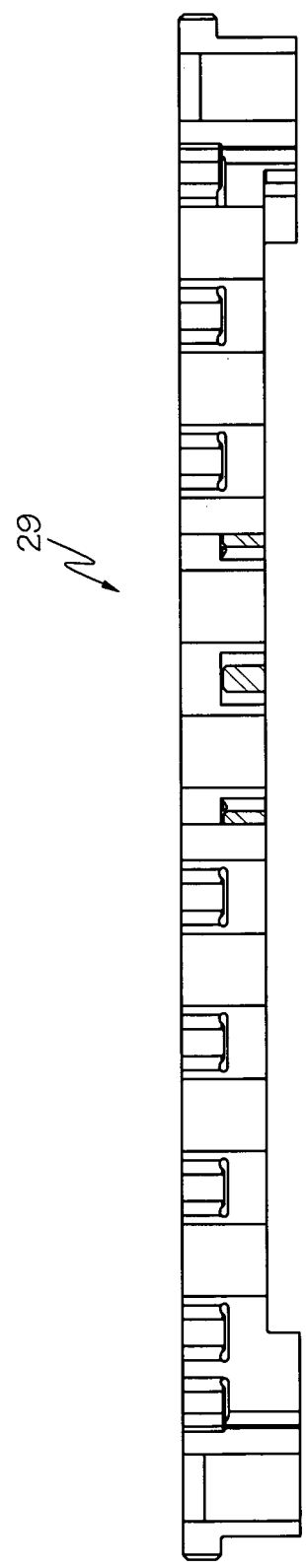
FIG. 15d is view of the left carrier plate taken along 15d-15d of FIG. 15c.
Figure 15G:
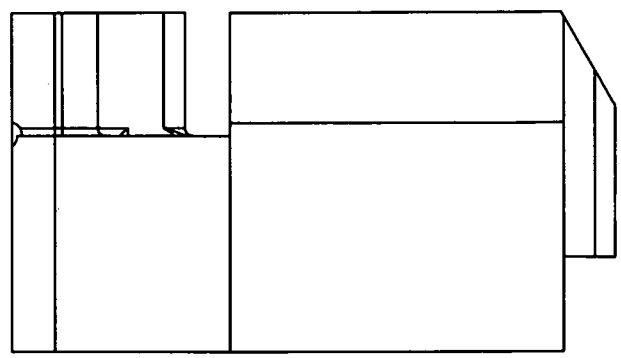
FIG. 15g is a view of the left carrier plate taken along 15g-15g of FIG. 15c.
Figure 15F:
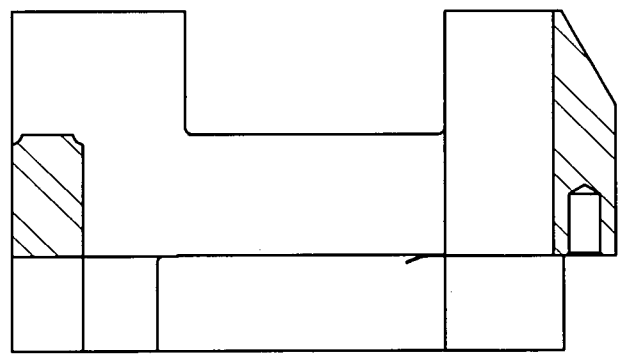
FIG. 15f is a cross sectional view of the left carrier plate taken along 15f-15f of FIG. 15c.
Figure 15E:
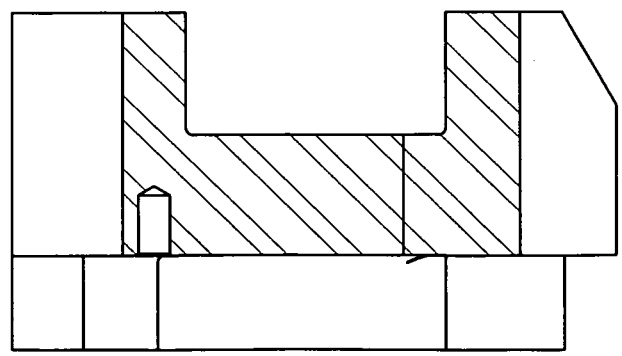
FIG. 15e is a cross sectional view of the left carrier plate taken along 15e-15e of FIG. 15c.
Figure 16A:
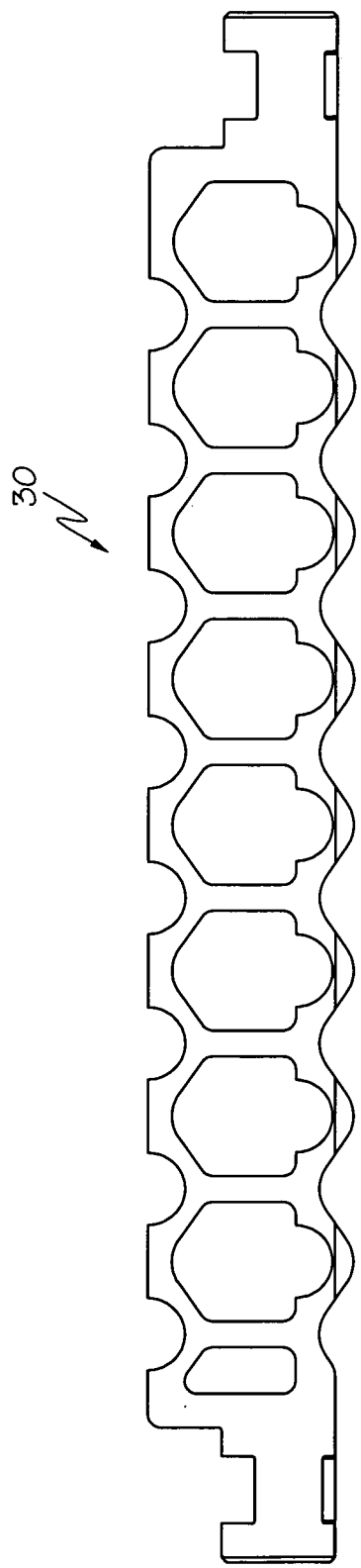
Figure 16B:
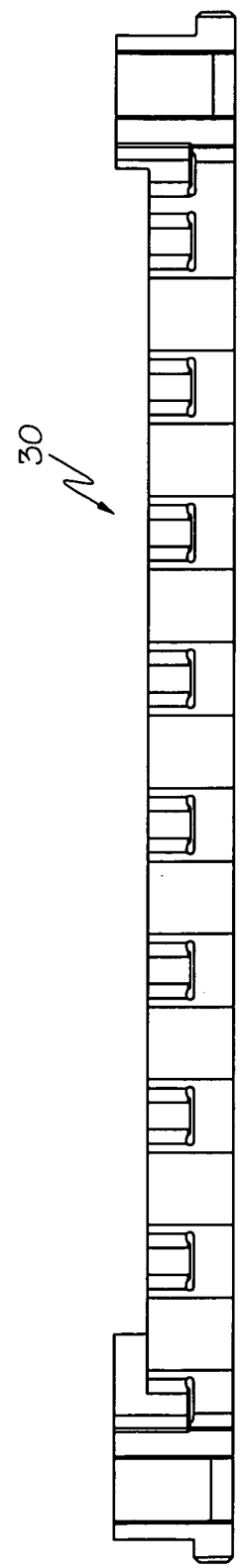
Figure 16C:
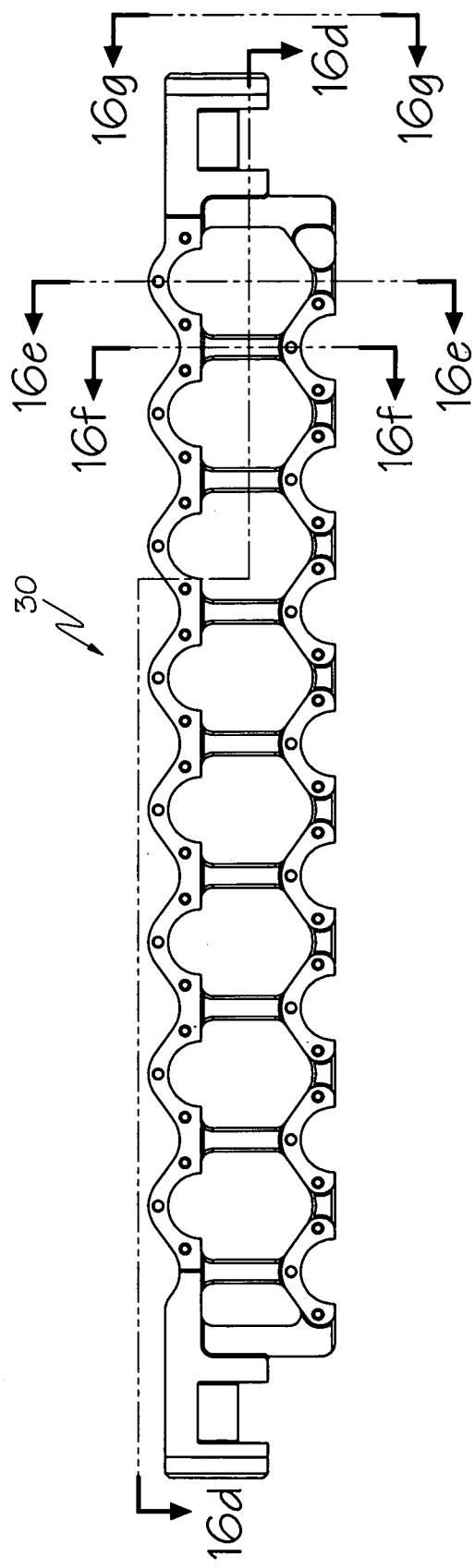
Figure 16D:
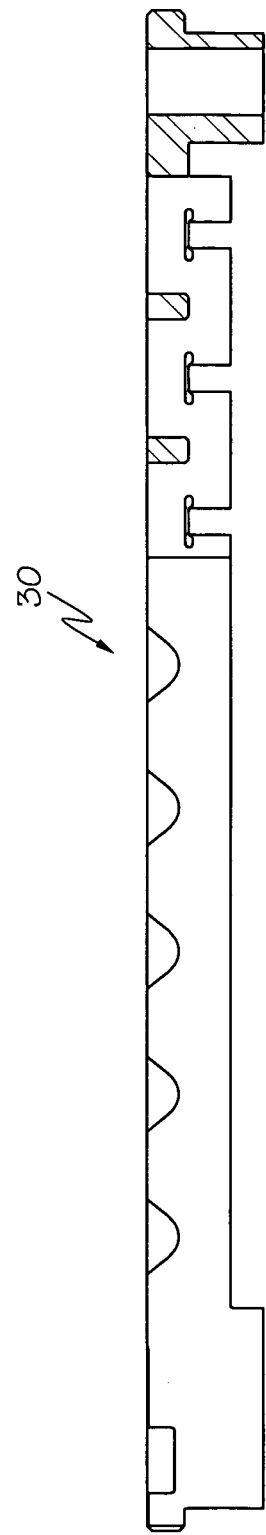
FIG. 16d is view of the right carrier plate taken along 16d-16d of FIG. 16c.
Figure 16G:
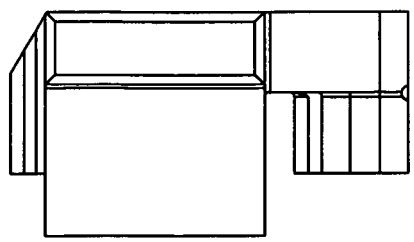
FIG. 16g is a view of the right carrier plate taken along 16g-16g of FIG. 16c.
Figure 16F:
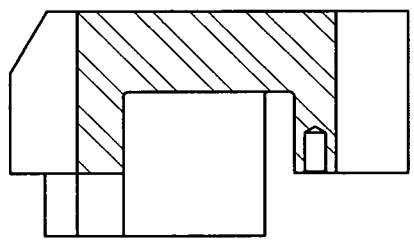
FIG. 16f is a cross sectional view of the right carrier plate taken along 16f-16f of FIG. 16c.
Figure 16E:
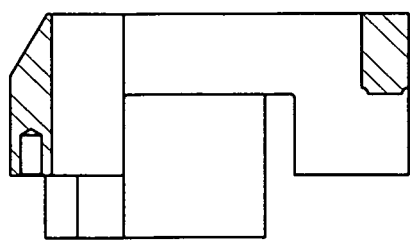
FIG. 16e is a cross sectional view of the right carrier plate taken along 16e-16e of FIG. 16c.
Figure 17B:
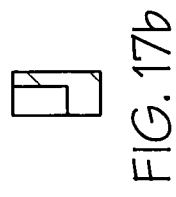
Figure 17C:
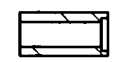
Figure 17A:
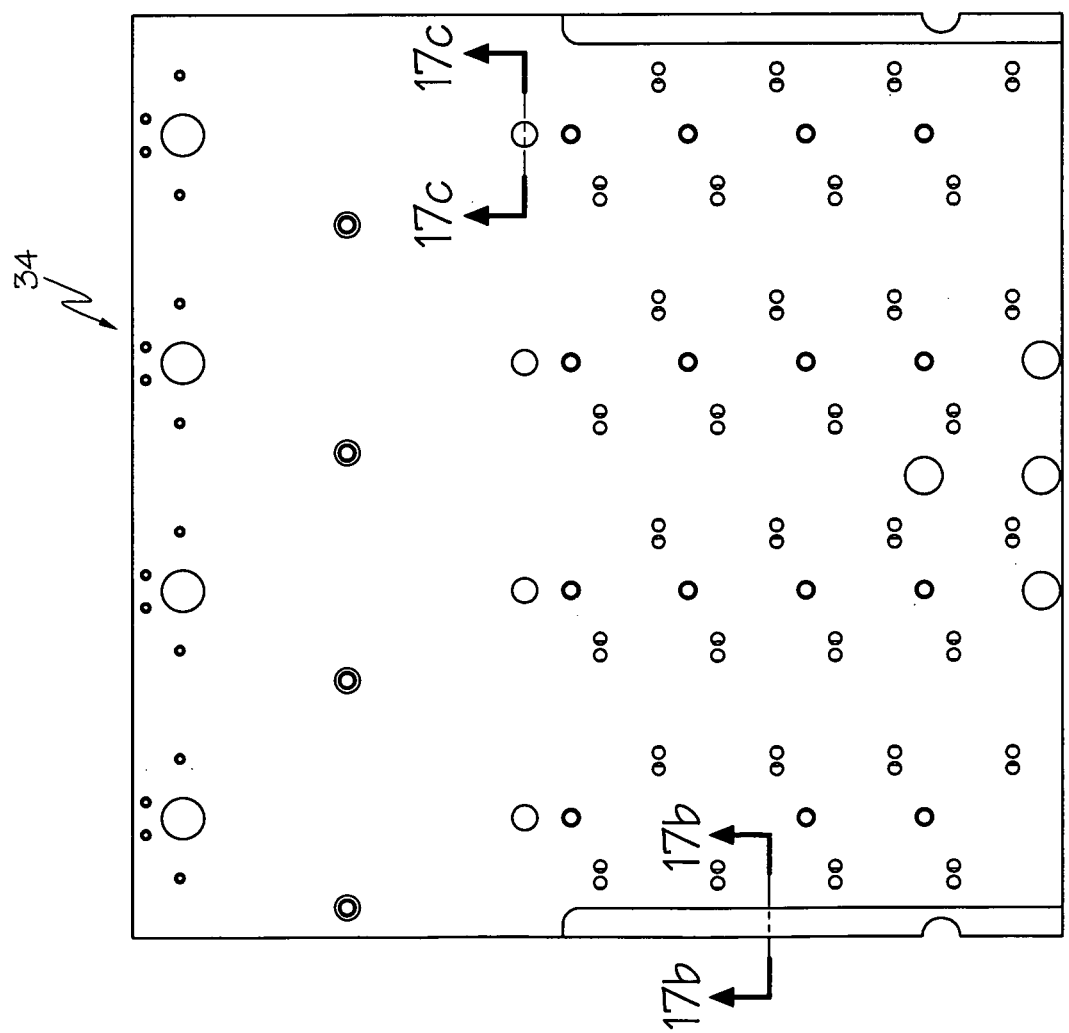
FIG. 17a is a top plan view of an exemplary embodiment of a first half section of the clamp plate of FIG. 1.
Figure 18:
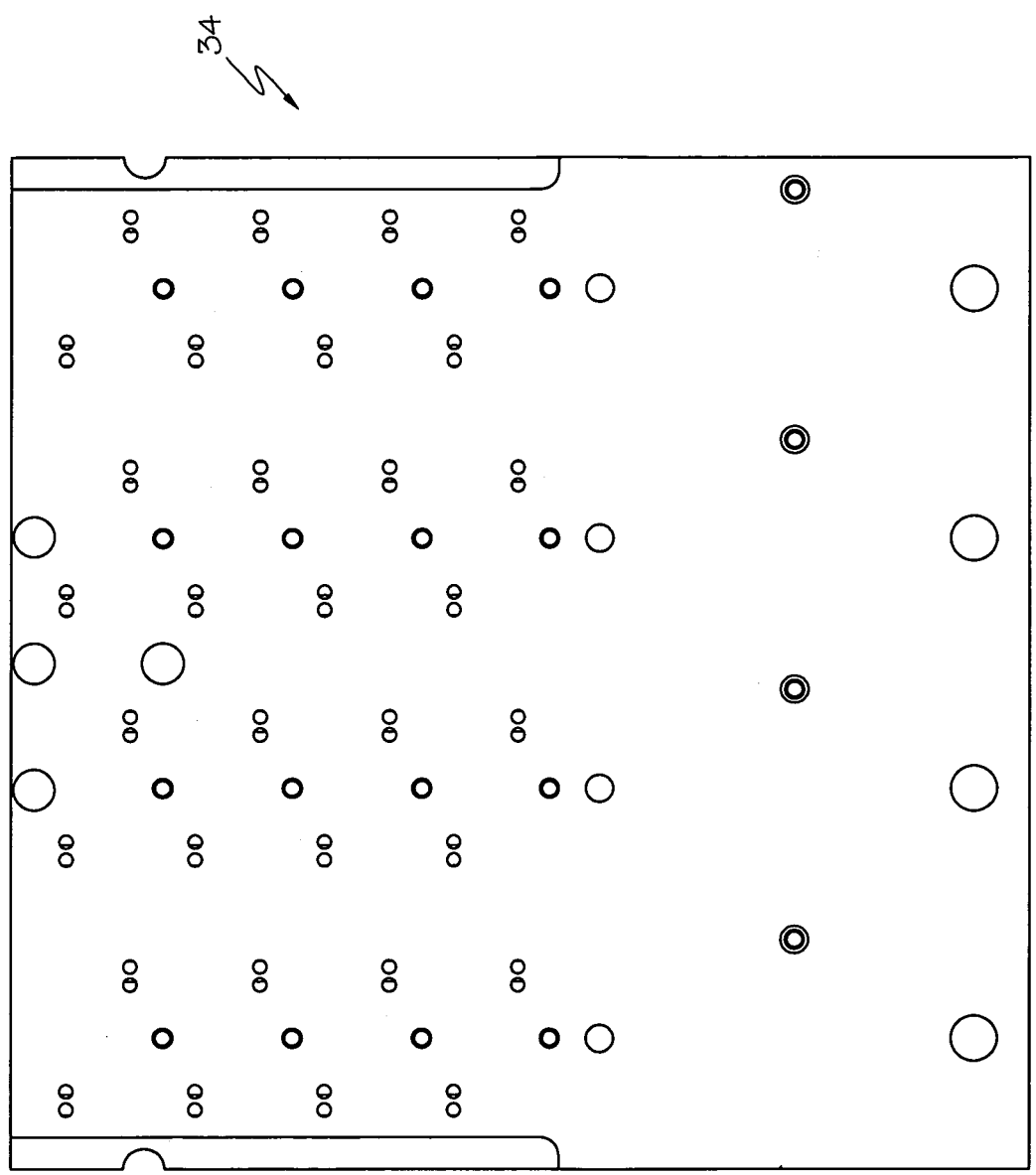
FIG. 18 is a top plan view of an exemplary embodiment of a second half section of the clamp plate of FIG. 3.
Figure 19B:
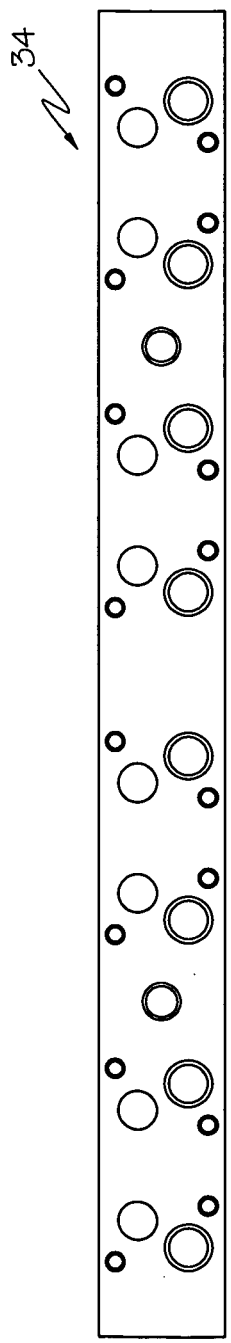
FIG. 19b is an end view of the second half section of FIG. 18.
Figure 19A:
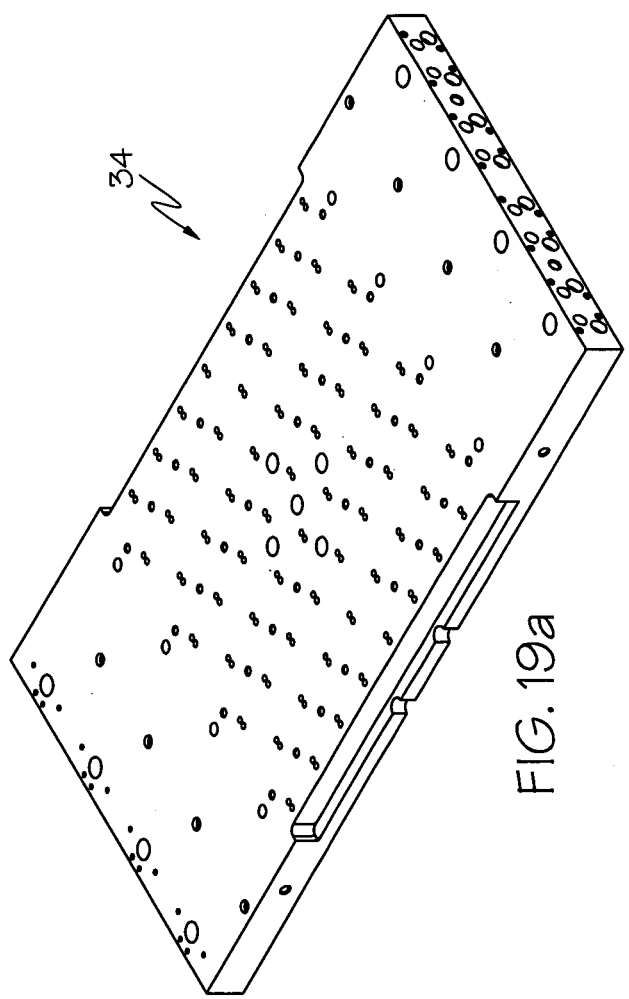
FIG. 19a is a perspective view of the first and second half sections of FIGS. 14 and 15 connected to form the clamp plate shown in FIG. 3.
Figure 21B:
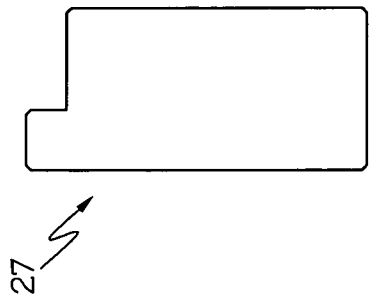
Figure 21D:
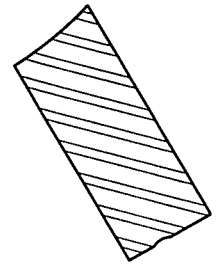
FIG. 21d is a cross section view of the gib taken along A-A of FIG. 21c.
Figure 21A:
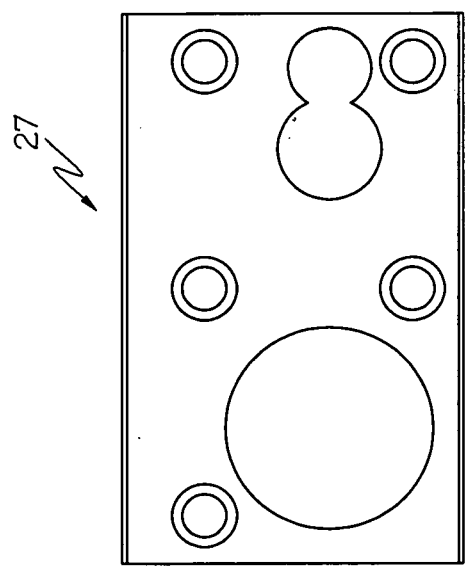
Figure 21C:
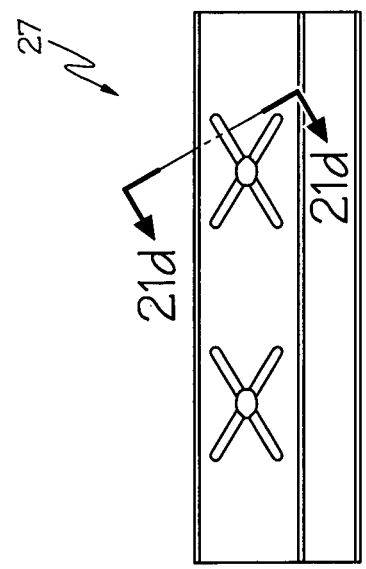
Figure 23C:
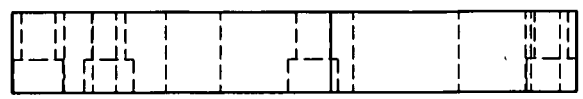
Figure 23A:
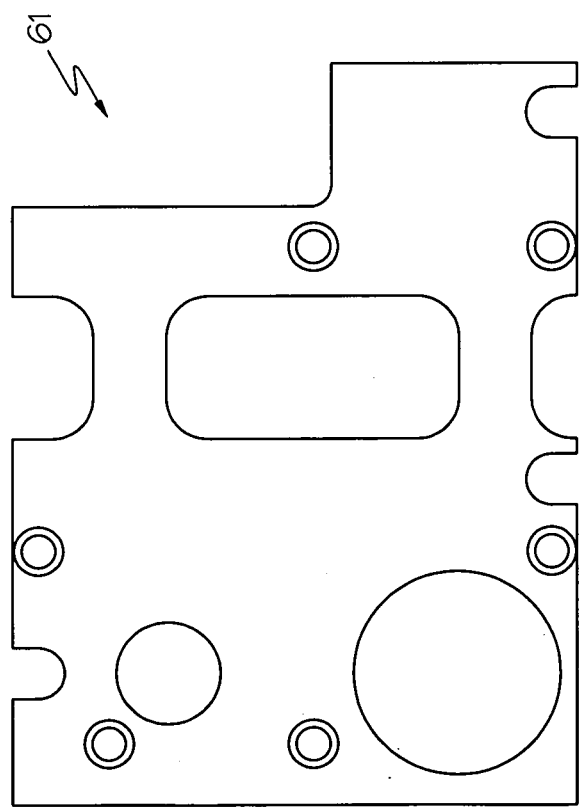
Figure 23B:
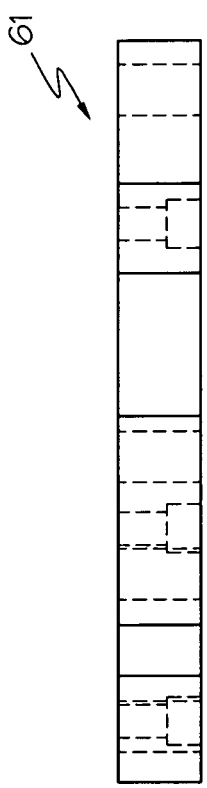

Each of the core side modules 20 may comprise a plurality of cores 6, extending outwardly from the core side module (e.g., FIGS. 5 and 6). Referring to FIGS. 3, 5, 6, 11, and 13-16, an individual core side module 20 is shown and described in detail below. When the core side module 20 is assembled, the core plate 1 serves as a base, a base end 6b of the sixteen cores 6 are inserted into the apertures 35 of the core plate 1 such that a flange 6a of the cores 6 rests upon a top surface 6c of the core plate 1. The sixteen core sleeves 11 are then slid onto the sixteen cores 6 such that flange 37 of the core sleeves 11 rests upon the core plate 1 and the flange 6a of the cores 6. The ejector plate 22 is then position upon the flange 37 such that the cores 6 and respective core sleeves 11 are inserted into each of the apertures 48 of the sleeves 11. The wear plate 25 is then positioned upon the ejector plate 22 such that the cores 6 are inserted through and the sleeves 11 extend through.

Next, the left and right carrier plates 29 and 30 are positioned upon the wear plate 25 such that the cores 6 extend through apertures 39. The thread splits 32 are slid over the cores 6 such that the cores 6 insert through apertures 47 and then connected to the left and right ejector plates such that the thread splits 32 are positioned relative to the cores 6 to create the thread finish. Two gibs 27, shown in FIGS. 3, 6, and 16, are connected to opposite ends of the ejector plate 22 and engage opposite ends of the left and right plate carriers 29 and 30, respectively, and assist in holding the core side module 20 together. As assembled, the apertures 35, 38, 48, 39, 47, 49 are coaxially aligned coaxially with each other. The core side modules 20 also comprise two Y-Cams 14 that are connected to opposite ends of the core plate 1 and that extend through the ejector plate 22 and the left and right carrier plates and two return cams 16 positioned opposite each other along each Y-Cam as shown. These Y cams create the opening of the threadsplits that is required to eject or remove the finish molded preform.

Also, each cavity side module 50 may comprise a plurality of cavities 56 disposed therein corresponding to each core 6 of the respective core side module (e.g., FIG. 5). Referring now to FIGS. 4, 7, 10, 12, and 23, an exemplary embodiment of the cavity side module 50 is shown. The cavity side module 50 comprises a cavity plate 51 that comprises a plurality of apertures 62 (e.g., sixteen staggered apertures disposed in two rows of eight) disposed therein and along the plate 51 such that the apertures align with the respective cores 6 of the core side module 20 when the two modules are placed into mating engagement with each other as set forth above. A plurality of cavity portions 56 are inserted into each of the apertures 62 and attached to the plate 51. The cavity side module 50 comprises thirty two baffle cavities 57 (which equals two baffle cavities per cavity portion 56), ninety-six baffle cavities 58 (which equals six baffle cavities per cavity portion 56), and thirty-two baffle cavities 59 (which equals two baffle cavities per cavity portion 56).

Each cavity portion 56 comprises a shaped chamber 63 that is configured to receive the respective cores 6 such that the combination of the shape chamber 63 and the inserted core 6 forms the mold chamber 65, creating a specific preform design. At each end of the cavity plate 51 and disposed upon its top surface are two filler blocks 61 as shown in FIGS. 4, 7, and 10. The cavity side module also includes two self lube bushings 53 within an opening through the cavity plate 51, forty-four connectors 60, sixteen o-rings 52 positioned around a base of each cavity 56, eighteen brass pipe plugs, and sixteen o-rings 55 positioned around an upper portion of each cavity 56 as shown in FIG. 6.

As set forth above, each of the core side modules 20 (e.g., first core side module 20a, second core side module 20b, third core side module 20c, and fourth core side module 20d) and respective cavity side modules 50 (e.g., first cavity side module 50a, second cavity side module 50b, third cavity side module 50c, and fourth cavity side module 50d are configured to matingly engage one another, forming respective preform mold stack-up modules (first mold stack-up module, second mold stack-up module, third mold stack-up module, and fourth mold stack-up module). Each preform mold stack-up module may comprise a plurality of preform molds 67 disposed therein formed by the plurality of core 6/cavity 56 combinations (e.g., preform mold 67 shown in FIG. 6).

As an example, when Preform Mold System 10 is connected to injection mold machine 1010, a clamping system (e.g., moving platen 44) of the injection mold machine can move core side modules (e.g., 20a, 20b, 20c, 20d) into mating engagement with cavity side modules (e.g., 50a, 50b, 50c, 50d), wherein the plurality of cores 6 of the core side modules are inserted into the plurality of respective cavities 56 of the cavity side modules to form the preform molds 67 within the four preform mold stack-up modules. FIG. 6b shows a cross section of a representative single mold stack-up, wherein a single core 6 is inserted into a single cavity 56 having a preform mold chamber 65 therebetween, forming the preform mold 67.

A fluidized plastic may be injected by the injector of the mold machine through the manifold and valve gate assembly 111 into the preform mold chambers 65 of each preform mold 67 of each preform mold stack-up module to form a plurality of plastic preforms having one or more preform designs or the same preform design. Due to the separate preform mold modules of Preform Mold System 10 being separately connectable and disconnectable to a single injection mold system, the present invention transforms and enables a single convention injection mold machine to form (mold) multiple preform designs simultaneously and to be adjustable as to its production output. For example, and not limitation, first core side module 20a and respective first cavity side module 50a may be designed to form a preform having a first preform design 110A, second core side module 20b and respective second cavity side module 50b may be designed to form a preform having a second preform design 110B, third core side module 20c and respective third cavity side module 50c may be designed to form a preform having a third preform design 110C, and fourth core side module 20d and respective fourth cavity side module 50d may be designed to form a preform having a fourth preform design 110D. Although not shown in FIGS. 3 and 4, the exemplary embodiment of the Preform Mold System 10 may permit a fifth and a sixth preform mold module to be connected to it. As such, the individual mold stack-up modules can be configured such that first preform design 110A, second preform design 110B, third preform design 110C, fourth preform design 110D, fifth preform design (not shown), and sixth preform design (not shown) are all different from each other as shown in FIG. 3, all the same, or some combination thereof. As will be explained below herein, Preform Mold System 10 of the present invention is configured such that it enables a single injection mold machine to mold one or more preform designs simultaneously, or sequentially. Each preform design may be assessed through mold flow analysis as known to one of ordinary skill in the art to determine the fill characteristics required (injection pressure and fill time) to mold the different preforms having the specific designs.

The quantity of preform molds 67 per preform mold stack-up module is based upon preform size and weight, and balanced material flow. The exemplary embodiment of Preform Mold System 10 comprises sixteen preform molds 67 per preform mold stack-up module (e.g., sixteen cores 6 per first core side module 20a/and sixteen cavities 56 per first cavity side module 50a). In the exemplary embodiment, the sixteen cores 6 are disposed in two rows of eight staggered cores 6 per core side module. The exemplary embodiment also may include sixteen cavities 56 disposed in respective two rows of eight staggered cavities 56 per cavity side module.

As shown, the clamp plate (e.g., 34) and manifold and valve gate assembly 111 are operable to receive four of these core side modules and four of these cavity side modules, respectively. Also, manifold and valve gate assembly 111 is operable to uniformly control and distribute the fluidized plastic into each of the preform molds 67 of one or more the preform mold stack-up modules that are attached to the injection mold machine. As such, the exemplary embodiment of Preform Mold System 10 may comprise from one to four mold stack-up modules comprising from sixteen preform molds (67) to sixty-four preform molds (67) that may be connected to injection mold machine 1010. Such a configuration of Preform Mold System 10 enables one injection mold machine to form from sixteen preforms to sixty-four preforms and from one to four different preform designs, simultaneously or sequentially, which conventional injection mold machines are not capable of doing.

As another example, clamp plate 34 may be configured to receive and connect to up to six core side modules 20 of Preform Mold System 10. In addition, Preform Mold System may comprise six respective cavity side modules 50 corresponding to the core side modules. As shown in FIGS. 6 and 7, both core side modules 20 and cavity side modules 50 may comprise sixteen staggered cores 6 and sixteen staggered cavities 56, respectively. Thus, each of the six core side modules 20 are operable to matingly engage with one of the six cavity side modules 50 to form sixteen preform molds 67 per preform mold stack-up module. Also, manifold and valve gate assembly 111 is operable to uniformly control and distribute the fluidized plastic into each of the preform molds 67 of one or more the preform mold stack-up modules that are attached to the injection mold machine. As such, the exemplary embodiment of Preform Mold System 10 may comprise from one to six mold stack-up modules comprising from sixteen preform molds (67) to ninety-six preform molds (67) that may be connected to injection mold machine 1010. In such a configuration, Preform Mold System 10 enables one injection mold machine to form from sixteen preforms to ninety-six preforms and from one to four different preform designs, simultaneously or sequentially, which conventional injection mold machines are not capable of doing.

It is understood that the quantity of molds per stack-up module and the configuration may vary, depending upon the preform design. Other exemplary embodiments of Preform Mold System 10 may comprise a total number of preform molds 67 (i.e., cavitation) of 4, 8, 16, 32, 48, 64, 80, 96, 100 molds, or more. In addition, the molds 67 may be positioned in other configurations such as inline rather than staggered.

Also, the number of preform mold modules that may be included with Preform Mold System 10 may be based on injection mold machine size (shot size, clamp size and clamp tonnage). As an alternative exemplary embodiment, the preform system 10 may comprise core side modules that comprise twenty cores 6, staggered in two rows of ten cores, and respective cavity side modules that comprise twenty respective cavities 56, staggered in two rows of ten cavities. In such an embodiment, clamp plate 34 and manifold and valve gate assembly 111 are operable to receive five of these core side modules and five of these cavity side modules, respectively. Also, manifold and valve gate assembly 111 is operable to uniformly control and distribute the fluidized plastic into each of the preform molds 67 of one or more the preform mold stack-up modules that are attached to the injection mold machine. Thus, in this exemplary embodiment, Preform Mold System 10 enables a single injection mold machine to form from twenty to one hundred preforms and from one to five different preform designs, simultaneously or sequentially.

As shown in FIGS. 3 and 9, the Preform Mold System 10 may include an ejector housing assembly 70 for each core side module 20. Each ejector housing assembly 70 (e.g., first ejector housing assembly 70a, third ejector housing assembly 70c, fourth ejector housing assembly 70d) is connected between the machine ejector plate 42 and the core side clamp plate(s) 34. An end of each ejector housing assembly 70 inserts through a hole in the clamp plate 34 and connects to each preform mold module 20 such that each ejector housing assembly 70 may move its respective preform mold module individually and separately to provide an equal or shorter ejection stroke than the ejector platen 42 on the press of the injection mold machine. This permits the ejection of preforms of different designs (i.e., lengths and finishes) by utilizing the ejection housing assembly 70 for each mold stack-up module to assist the press ejection system in ejecting each preform from the preform molds 67. Also, each ejector housing assembly 70 is easily connected and disconnected via bolt connections from the ejector plate 42 and the core side clamp plate 34 as known to one or ordinary skill in the art to permit simple and efficient change-outs and adaptation to changing production requirements.

Phase I production section 1002 may also comprise a dryer 1050 as known to one of ordinary skill in the art and thus no need to be described in great detail herein. Dryer 1050 may be used to provide process drying of the raw material resin in preparation for the preform injection mold process. At this point in the system, all of the available water carried by the resin is removed by dryer 1050. This may be accomplished with the application of adequate temperature with the corresponding exposure time and air quality. All these conditions, if not properly maintained at the proper levels, may cause the manufacturing cell 1000 to produce a substandard product. Dryer 1050 may comprise a dehumidified hopper dryer (not shown) with high temperature process options. Such a dehumidified hopper dryer is commercially available and as known to one of ordinary skill in the art.

In drying, there are four principle factors. First, adequate airflow may be necessary to carry thermal energy to the resin, and provide enough air exchanges to carry away all of the water. The second element in drying may be the dryness or dewpoint of the air entering the process drying hopper. Dewpoint is defined as the temperature at which 100 percent relative humidity exists. The third aspect of drying may be temperature. The drying temperature should be selected as to not fuse the resin in the vessel while still removing all of the water available within the resin. An operator may balance the airflow, dewpoint and temperature such that there are each at the acceptable ranges.

The fourth aspect of the drying process is the drying hopper. There are several functions performed by this relatively simple appearing vessel. First, the size of the vessel is selected to give the desired holding or dwell time for the drying to take place. If the vessel is undersized, then un-dried resin may proceed to the molding machine. Conversely, it may not be desirable to have a wide range of drying times which would be exacerbated by an overly large dryer.

As shown in FIG. 2, as the customer's production requirements increase, manufacturing cell 1000 may include a phase II production section 1003, a phase III production section 1004, or any number of additional phase production sections as required. It is understood that the phase II production, phase III production, and any additional phase production sections may include the same or substantially similar equipment as phase I production section 1002 or include different equipment for manufacturing a different product. Manufacturing cell 1000 may be a customized and modular system.

Next, one or more facilities and equipment technicians may procure and assemble, at the selected site of the customer, the highly efficient, specific-to-the-customer mobile manufacturing system and cell 1000. All equipment and supplies required for the system are chosen based on their mobility and adaptability for quick expansion, reduction, assembly, disassembly, and/or relocation capabilities. During the above step, operational personnel necessary to operate the preform manufacturing system are recruited and hired.

Once hired, the personnel are trained on the preform manufacturing system. Generally, this training may be preformed off-site from the customer's location on similar equipment and materials. In one exemplary embodiment, the off-site training is provided at a central site such as the provider of the mobile manufacturing system and method, wherein similar equipment is set up for customer training. It is understood that this training may be provided and performed at the customer's final location, i.e., the location where the customized mobile manufacturing system ultimately be located.

Chart I set forth below shows and describes an exemplary embodiment of the training provided and included in the system and method of the present invention. Specifically, Chart I shows an exemplary individual training record that may be provided to one or more of the operational personnel (e.g., an operator and assistant operator of the mobile manufacturing system). The individual training record of Chart I includes numerous headings which detail key information regarding the training of the mobile manufacturing system operator and/or assistant operator.

CHART I

Employee Name: _____

| | | | Operator & Assistant Operator | | | | | Operator & Assistant Operator | Employee Initials | Trainer Initials | Training Date | Original or Refresher Training |
|---|---|---|---|---|---|---|---|---|---|---|---|---|
| Training Course | Document Number | Type of Doc | Document Name | Validation Source | Approved Trainers | Course Hours | Training Frequency | Assistant Operator | | | | |
| HRS | 6300 | SAF | EMERGENCY INFORMATION BOOK | Q | DIRECTORS | 0.5 | Y | P | | | | |
| HRS | 6307 | SAF | PLANT EVACUATION | Q | DIRECTORS | 0.3 | Y | P | | | | |
| HRS | 6341 | SAF | SHELTER | Q | DIRECTORS | 0.3 | Y | P | | | | |
| HRS | 6346 | SAF | HIGH DEW POINT | Q | DIRECTORS | 0.3 | Y | P | | | | |
| HRS | 6446 | SAF | HIGH DEW POINT - MANAGER ON-CALL OWNS TOOLS NECESSARY TO PERFORM WORK | Q | DIRECTORS | 0.3 | Y | P | | | | |
| HRS 101 | 0 | 0 | | D | DIRECTOR OF HR | 0.1 | I | P | | | | |
| HRS 101 | 0 | 0 | LOCKOUT:TAGOUT SYSTEM INSTRUCTIONS | D | MAINTENANCE MGR. | 1 | I | P | | | | |
| HRS 101 | 002 | WI | MSDS PROCESS | D | DIRECTOR OF HR | 0.4 | I | P | | | | |
| HRS 101 | 6006 | FM | EYE PROTECTION ISSUING FORM | D | DIRECTOR OF HR | 0.1 | I | P P | | | | |
| HRS 101 | 7020 | TR | FORKLIFT:PEDESTRIAN SAFETY (video) CROWN | Q | DIRECTOR OF HR | 0.5 | I | P | | | | |
| HRS 101 | 7022 | TR | FORKLIFT:SAFETY (video) | Q | DIRECTOR OR HR | 1 | I | P | | | | |
| HRS 101 | 7024 | TR | HAZARD COMMUNICATION (video) | D | DIRECTOR OF HR | 0.4 | I | P | | | | |
| HRS 101 | 7025 | TR | MSDS (video) | D | DIRECTOR OF HR | 0.4 | I | P | | | | |
| HRS 101 | 7026 | TR | LOCKOUT/TAGOUT AWARENESS (powerpoint) | Q | DIRECTOR OF HR | 0.4 | I | P | | | | |
| HRS:101 | 7029 | TR | 5S TRAINING VIDEO | D | HUMAN RESOURCE DIRECTOR | 1.2 | I | P | | | | |
| HRS 101 | 8001 | EMP | EMPLOYEE HANDBOOK | D | DIRECTOR OF HR | 0.2 | I | P | | | | |
| HRS 201 | 603 | REF | EMERGENCY CONTACT NUMBERS | D | DIRECTOR OF OPERATIONS/ DIRECTOR OF QUALITY | 0.2 | I | P | | | | |
| HRS 201 | 3003 | FM | LOCK OUT/TAG OUT TEST FORM | Q | MAINTENANCE MGR. | 1 | I | P | | | | |
| HRS 201 | 3004 | FM | SAFETY LOCK ASSIGNMENT FORM | D | MAINTENANCE MGR. | 0.2 | I | P | | | | |
| HRS 201 | 6001 | FM | ITR (INDIVIDUAL TRAINING RECORD) BLANK | Q | DIRECTOR OF HR | 0 | Q | P | | | | |
| HRS 401 | 5123 | FM | JOB DESCRIPTION | D | DIRECTORS | 0.5 | I | P | | | | |
| MNT 101 | 308 | WI | LOCKOUT TAG OUT double check against 6803 | Q & D | MAINTENANCE MGR. | 2 | Y | P P | | | | |
| MNT 101 | 322 | WI | VACUUM PUMP FILTER CLEANING | D | MAINTENANCE MGR. | 0.5 | I | P | | | | |

CHART I-continued

| | | | | Operator & Assistant Operator | | | | Employee Name: Operator & Assistant Operator | | | | |
|---|---|---|---|---|---|---|---|---|---|---|---|---|
| Training Course | Document Number | Type of Doc | Document Name | Validation Source | Approved Trainers | Course Hours | Training Frequency | Assistant Operator | Employee Initials | Trainer Initials | Training Date | Original or Refresher Training |
| MNT 101 | 1013 | FM | VIRGIN/REGRIND SET-UPS | D | MAINTENANCE MGR. | 0.5 | I | P | | | | |
| MNT 101 | 1024 | FM | CAVITATION CHANGE FORM | D | INJ MOLD MGR. | 0.3 | I | P | | | | |
| MNT 101 | 3014 | FM | MAINTENANCE TECHNICIAN CHECKLIST | D | MAINTENANCE MGR. | 2 | I | P | | | | |
| MNT 101 | 3100 | FM | CONVEYOR BELT PM CHECKLIST | D | MAINTENANCE MGR. | 4 | I | P | | | | |
| MNT 101 | 3108 | FM | SILO CLEANING CHECKLIST | D | UNLOADING SUPERVISO | 1 | I | P | | | | |
| MNT 201 | 303 | WI | WATER HOSE CONNECTION INSTRUCTIONS | D | MAINTENANCE MGR. | 1 | I | P | | | | |
| MNT 201 | 314 | WI | CLEANING GUIDELINES - HUSKY PRESS 14 | D | MAINTENANCE MGR. | 2 | I | P | | | | |
| MNT 201 | 315 | WI | CLEANING GUIDELINES - HUSKY PRESS 15 | D | MAINTENANCE MGR. | 2 | I | P | | | | |
| MNT 201 | 3015 | FM | HUSKY MOLD PM PROCEDURE | D | INJ MOLD MGR. | 0 | O | P | | | | |
| MNT 201 | 6005 | FM | TOOL LAYOUT CHART | D | INJ. MOLD MGR. | 0 | O | P | | | | |
| MNT 401 | 3020 | FM | PRESS PREVENTION MAINTENANCE PROGRAM-SCHEDULE | D | MAINTENANCE MGR. | 0.3 | I | P | | | | |
| OPS 101 | 006 | REF | SHIFT TRANSITION BRIEFING | D | INJ. MOLD MGR. | 0.5 | Y | P | | | | |
| OPS 101 | 100 | REF | INJECTION MOLD TRAINING 101 | D | INJ. MOLD MGR. | 4 | Y | P | | | | |

Column 1 of Chart I above describes the category and level of the training course. BUS signifies a Business Course; HRS signifies a Human Resource Services Course; MNT signifies a Maintenance Course; OPS signifies an Operations Course; QUA signifies a Quality Course; SRW signifies a Shipping, Receiving, and Warehouse Course; and SYS signifies a Systems Course. Courses are offered at different levels, i.e. 101 is an entry level, 201 is a greater technical level, 301 is a highly technical level, and 401 is at the management or specialist level.

Column 2 provides the unique document number used to manage the documents.

Column 3 describes what kind of document it is, i.e. WI signifies a Work Instruction, FM signifies the document is a form, REF signifies the document is a reference document, TR signifies the document is a training document, EMP signifies the document is in the employee handbook, SAF signifies the document is in the safety handbook, and PFD signifies the document is a Process Flow Diagram.

Column 4 details the document name.

Column 5 states how the training will be validated, i.e. by either D for demonstration or Q for a quiz.

Column 6 states the approved trainer for the specific course.

Column 7 states the estimated time the course will take to complete.

Column 8 states the frequency of the training, i.e. S indicates the course must be completed prior to being hired; P indicates the course is a competency course and must be performed prior to being qualified in the position; and A or blank signifies the employee in this position must only be aware of the existence of this course and it has no competency need.

The remaining columns, columns 9 thru 12, are fields for the employee and trainer to initial when the training is complete.

An operator and assistant operator must complete all S and P courses and have their training validated (D or Q) before they are considered qualified.

Either simultaneously to or sequentially with the hiring and initial training of the manufacturing personnel, the mobile and/or manufacturing cell may be constructed at the customer's site or at a site in close proximity to the customer's production site. The Provider as part of the method of the present invention may also provide all the construction design, request for proposal preparation, evaluation, and approval, subcontractor and construction management and oversight, budget estimation, review, and approval, and/or any other processes, steps, or items related to the construction and testing of the mobile and/or modular manufacturing cell of the present invention. Once the mobile and/or modular manufacturing cell is built, the Provider will run a sample production run, and then supply the customer will a product sample and the test run's data for evaluation and/or approval.

When the mobile manufacturing system (e.g., mobile preform manufacturing system) is ready for start-up production, the trained operations personnel (e.g., operator(s) and/or assistant operator(s)) are brought to the final location and trained on-site on the customized mobile manufacturing system (e.g., mobile preform manufacturing system) specifically designed to meet the defined customer requirements.

The mobile and/or modular manufacturing system and method of the present invention also offers immediate, responsive on-site support and services by industry experts in all aspects of the customers' operation. This immediate, responsive on-site support and services may be provided in a variety of methods. Exemplary methods that may be used include, but are not limited to, providing on-site personnel (e.g., provider personnel, trained customer personnel, etc.), real-time customer support via a network, intranet, the Internet, telephone, other customer support contact options, system monitoring (e.g., on-site and remote), and/or any combinations thereof.

For example, the system and method of the present invention may include a monitoring system that is operable to monitor the mobile manufacturing system and its operational parameters on-site and/or from a remote location (e.g., a central location, provider's remote facilities). The system may be operable to monitor, alarm, track, and record the operational run time, down time, failure rates, production volume, flow rates, fill pressure, cycle time, and/or any other operational or system functions and/or parameters for the whole manufacturing system and/or any individual component. Such monitoring systems and components may be comprise conventional monitoring systems and components as known to one of ordinary skill in the art and be assembled and customized to meet the specific customer's requirements.

One exemplary monitoring system may comprise real time process monitoring of the mobile and/or modular manufacturing cell or cells and may be viewed from any computer terminal. The monitoring system software is programmed to comprise color coding in order to provided the status of a current job(s) or mold press(es). On the monitor screen, the field for either the job or press will turn colors according to the status of the respective job and/or press. For example, the color "Green" may indicate that all the monitored parameters for the job(s) and/or press(es) are within the specified limits. The color "Red" may indicate that one or more of the monitored parameters for the job(s) and/or press(es) have exceeded its specification limits. The color "Yellow" may indicate that the job(s) and/or press(es) has not cycled within its non-production limit. The color "Blue may indicate that there is no active job for that specific press. Finally, the color "Purple" may indicate that the monitoring unit is not communicating with the host computer.

The system and method of the present invention may also comprise a monitoring system capable of real time monitoring parameters and cycle times of one or more of the machines in the manufacturing cell. The software may include fields for cycle time and other machine parameters that may be viewable on any computer terminal. These fields may turn colors according to the status of the monitored parameters. For example, the color "Green" may indicate that all the monitored process parameters are within the specified limits. The color "Red" may indicate that one or more of the monitored parameters has exceeded its specification limit. The color "White" may indicate that one or more of the monitored parameters is running below the specified limit.

Additionally, the system and method of the present invention may also comprise a monitoring system that also performs real time monitoring for Yield Efficiency of a certain job. The software may be programmed to calculate, provide, and display a yield efficiency for one or more jobs and be color coded to provide the status of the efficiency of the one or more jobs. For example, the color "Green" may indicate that the job is performing within its expected yield limits. The color "Red" may indicate that the job is performing below the expected yield limit, which reflects inefficiency in the process. The color "White" may indicate that the job is performing above the expected yield limit, which reflects a more efficient process. It is understood that a variety of colors, conditions, indicators, and monitoring configurations may be used with the present invention.

The system performs the functions described above as a stand alone system.

If, and when the manufacturing system is no longer needed and required on-site by the customer, the system can be quickly dismantled and removed from the on-site location. The mobile manufacturing system's mobility attribute supports quick expansion, relocation, or reduction capabilities. The complete system and method offers a customer quality product (e.g., preforms), services, and support (the "products and services") according to parameters and requirements collected from the user. Mobile Manufacturing establishes and operates complete preform production matched to the unique customer's requirements. The system will reduce or eliminate capital investment expenditures; shorten the supply chain; accommodate and react to just-in-time requirements; and ultimately, manage the cost of the manufactured preforms.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A method of manufacturing, comprising:
   identifying a customer's production requirements at the customer's production facility;
   designing a manufacturing cell based upon the identified production requirements;
   delivering components for the manufacturing cell to a location at or near the customer's production facility;
   assembling the components to form the manufacturing cell at the location, wherein the manufacturing cell comprises:
   a modular preform mold system comprising:
      a plurality of preform core side modules having a plurality of preform mold cores,
      a core side clamp plate connectable to a moving platen of an injection mold machine and operable to receive the plurality of preform core modules, individually or simultaneously,
      a plurality of preform cavity side modules having a plurality of preform mold cavities disposed therein, each one of the plurality of preform cavity side modules corresponding to and operable to engage a respective one of the plurality of core side modules to form a plurality of preform molds having a respective preform design wherein the plurality of preform molds are of one or more unique preform designs, and wherein the number of cavity side modules and corresponding core side modules is adjustable,
      a plurality of ejector housing assemblies for connecting the plurality of core side modules to an ejector platen of the injection mold machine, each one of the plurality of ejector housing assemblies corresponding to a respective one of the plurality of core side modules,
      a manifold and valve gate assembly connectable to a stationary platen of an injection mold machine and operable to receive the plurality of preform cavity modules and place the plurality of preform mold cavities in fluid communication with an injector of the injection mold machine,
      wherein the manifold and valve gate assembly is operable to uniformly control the injection of fluidized plastic into each of the plurality of preform molds in fluid communication with the manifold and valve gate assembly whereby a plurality of unique preform designs may be formed simultaneously while using a single injection mold machine, and
   training operational personnel to operate the manufacturing cell.

2. The method according to claim 1, wherein the manufacturing cell comprises an injection mold machine.

3. The method according to claim 2, wherein the injection mold machine comprises a preform injection mold machine.

4. The method according to claim 3, wherein modular preform mold system connects to the preform injection mold machine.

5. The method according to claim 1, wherein the step of identifying the customer's production requirements comprises an interview of one or more of the customer's personnel to assist in defining the customer's production requirements.

6. The method according to claim 1, wherein the step of training operational personnel to operate the manufacturing cell comprises training the operational personnel at a Provider's facilities.

7. The method according to claim 1, wherein the step of training operational personnel to operate the manufacturing cell comprises training the operation personal on the assembled manufacturing cell's equipment at the Customer's production facility.

8. The method according to claim 1, further comprising monitoring one or more parameters of the manufacturing cell remotely.

9. The method according to claim 1, wherein the manufacturing cell comprises a base systems section and a first phase production section.

10. The method according to claim 9, further comprising assembling a second phase production section based upon increased customer production requirements.

11. The method according to claim 10, further comprising assembling a third phase production section based upon increased customer production requirements.

12. The method according to claim 9, further comprising assembling one or more phase production sections based upon increased customer production requirements.

13. The method according to claim 12, further comprising disassembling the one or more phase production sections based upon decreased customer production requirements.

14. The method according to claim 13, further comprising disassembling the manufacturing cell based upon decreased customer production requirements.

15. The method according to claim 14, further comprising removing the manufacturing cell and the one or more phase production sections from the customer's production facility.

16. The method according to claim 1, wherein the manufacturing cell is mobile and/or modular.

17. A method according to claim 1, further comprising capturing scrap plastic materials, regrinding the scrap plastic materials, and reusing the ground plastic material for production of new products.

18. A method of preform manufacturing, comprising:

identifying a customer's preform production requirements at the customer's production facility;

designing a preform injection mold manufacturing cell based upon the identified preform production requirements;

delivering components for the preform injection mold manufacturing cell to a location at or near the customer's production facility;

assembling the components to form the preform injection mold manufacturing cell at the location, wherein the manufacturing cell is adjustable in number of preform molds of or more unique preform designs, assembly of the manufacturing cell comprising:

attaching a core side clamp plate to a moving platen of a single injection mold machine, the first clamp plate adapted to receive from one to six preform core side modules, individually or simultaneously, wherein each preform core side module comprises a plurality of preform mold cores;

engaging the preform core side modules with the respective mating preform cavity side modules to form a plurality of preform molds; and attaching a manifold and valve gate assembly to a stationary platen of the single injection mold machine, the manifold and valve gate assembly adapted to receive from one to six respective preform cavity side modules, individually or simultaneously, wherein each preform cavity side module comprises a plurality of preform mold cavities, and the plurality of mold cores of the preform core side modules are adapted to insert within the plurality of preform mold cavities of the respective preform cavity side modules, wherein the manifold and valve gate assembly is operable to uniformly control the injection of fluidized plastic into each of the plurality of preform molds in fluid communication with the manifold and valve gate assembly, whereby a plurality of unique preform designs may be formed simultaneously while using only a single injection mold machine.

* * * * *

UNITED STATES PATENT AND TRADEMARK OFFICE
CERTIFICATE OF CORRECTION

PATENT NO.       : 8,543,434 B2
APPLICATION NO.  : 12/127402
DATED            : September 24, 2013
INVENTOR(S)      : Karin S. Gaiser Page 1 of 1

It is certified that error appears in the above-identified patent and that said Letters Patent is hereby corrected as shown below:

In the Claims

Col. 24, Claim 6, Line 31-32,
"cell comprises training the operational personnel at a Provider's facilities." should read
--cell comprises training the operational personnel at a customer's facilities.--;

Col. 24, Claim 7, Line 35,
"cell comprises training the operation personal on the" should read
--cell comprises training the operation personnel on the--; and Col. 24, Claim 7, Line 36,
"assembled manufacturing cell's equipment at the Customer's" should read
--assembled manufacturing cell's equipment at the customer's--.

Signed and Sealed this
Fifth Day of August, 2014

Michelle K. Lee
*Deputy Director of the United States Patent and Trademark Office*